US005661779A

United States Patent [19]
Lee

[11] Patent Number: 5,661,779
[45] Date of Patent: Aug. 26, 1997

[54] RAPID RESPONSE BACKUP SYSTEM FOR TELECOMMUNICATIONS NETWORKS

[75] Inventor: Otha C. Lee, Kirkland, Wash.

[73] Assignee: Proctor & Associates Company, Inc., Redmond, Wash.

[21] Appl. No.: 216,008

[22] Filed: Mar. 22, 1994

Related U.S. Application Data

[63] Continuation-in-part of Ser. No. 207,473, Mar. 7, 1994, abandoned.

[51] Int. Cl.$^6$ ........................................... H04M 11/00
[52] U.S. Cl. ................................... 379/45; 379/93.15
[58] Field of Search .............................. 379/45, 46, 47, 379/48, 49, 94, 93, 59, 34

[56] References Cited

U.S. PATENT DOCUMENTS

| | | | |
|---|---|---|---|
| 3,715,503 | 2/1973 | Jungbluth et al. | 179/15 BF |
| 3,864,533 | 2/1975 | Erlund | 179/175.3 R |
| 4,887,290 | 12/1989 | Dop et al. | 379/59 |
| 5,027,383 | 6/1991 | Sheffer | 379/39 |
| 5,125,021 | 6/1992 | Lebowitz | 379/39 |
| 5,131,019 | 7/1992 | Sheffer et al. | 379/39 |
| 5,187,706 | 2/1993 | Frankel et al. | 370/16.1 |
| 5,239,570 | 8/1993 | Koster et al. | 379/45 |
| 5,388,147 | 2/1995 | Grimes | 379/45 |
| 5,404,350 | 4/1995 | DeVito et al. | 370/16 |
| 5,454,025 | 9/1995 | Mulrow et al. | 379/48 |

OTHER PUBLICATIONS

INB-911™ System Manual, Revision Level C, Dec. 8, 1992.
Instant Network Backup–911 System Brochure, Publication No. 75, Rev. 1 1991.

*Primary Examiner*—Stella Woo
*Attorney, Agent, or Firm*—Seed and Berry LLP

[57] ABSTRACT

An instant telecommunications network backup system includes several trunk diverter circuits and several responder circuits. Each trunk diverter circuit is installed proximate to an originating central office within the telecommunications network and monitors an outgoing trunk for faulty conditions. The trunk diverter circuit maintains a database that classifies each responder circuits as being in one of two classes: a maintain link class and a disabled class. One or more responder circuits are installed proximate to an emergency response facility. Whenever a faulty condition is detected, the trunk diverter circuit establishes an alternative telecommunications path through either a public switch telephone network or a mobile telephone switching network to one of the responder circuits in the maintain link class. The trunk diverter circuit and the responder circuit exchange communications with each other. When the trunk diverter circuit detects an incoming emergency telephone call, the trunk diverter circuit and responder circuit surrender the alternative path to the emergency telephone call to permit the telephone caller to access the emergency facility through the alternative path. If no alternative path has previously been established, then the trunk diverter circuit establishes an alternative communications path to any of the responder circuits, regardless of their class, and reroutes the emergency telephone call therethrough. Alternatively, the trunk diverter circuit is installed approximate to a remote switching office and monitors for an alarm signal from the remote switching office. The trunk diverter circuit establishes an alternative communications path to one of the responder circuits after detecting the alarm signal. Data identifying the location of the central office is supplied to the emergency response facility if specific data regarding the location of the emergency telephone call is unavailable.

32 Claims, 18 Drawing Sheets

RAPID RESPONSE BACKUP SYSTEM FOR TELECOMMUNICATIONS NETWORKS

CROSS-REFERENCE TO RELATED APPLICATION

This application is a continuation-in-part of application Ser. No. 08/207,473, filed on Mar. 7, 1994, now abandoned, having the same inventors as this application.

TECHNICAL FIELD

This invention relates to backup systems for communications networks, particularly backup systems for emergency telecommunications networks.

BACKGROUND OF THE INVENTION

Emergency telecommunications networks have been established to respond to emergency telephone calls from the public. These "911 networks" were established and added to the existing public switched telephone networks ("PTN"). In such a 911 network, a person places an emergency telephone call (a "911 call") that is routed in through the PTN to an appropriate public service answering point ("PSAP"). The PSAP receives the 911 call and contacts the appropriate emergency agency, such as the fire department or police department.

As shown in FIG. 1A, a 911 call is generally routed through the PTN as follows. First, the 911 call 114 is sent through the line connected to the calling phone to an originating central office ("C.O.") 112 that is connected thereto. Second, the call is routed on a trunk 107 from the originating C.O. to a tandem switch 110. Finally, the tandem switch routes the 911 call over a trunk 106 directly to the PSAP 102. In some applications, the 911 call is sent directly to the PSAP by the C.O.

The tandem switch 110, or tandem office, is a complex software-controlled trunk-to-trunk switching system that routes the 911 call to the appropriate PSAP facility 102. The tandem switch 110 compares the number of the originating phone call to a database to determine which PSAP has jurisdiction over the 911 caller's location. The caller's phone number is transferred from the tandem switch to the PSAP facility 102 to be displayed on a terminal at the PSAP facility.

Currently, most PSAPs have a dedicated trunk line from the originating central office to the PSAP, often via the tandem switch. At any point in this dedicated path, a failure could happen. A failure could be caused by a cable break or dig-up, equipment failure, tandem hardware or software failure, or catastrophic damage from storm activity, flood, earthquake, and the like. When the dedicated 911 network fails, the 911 caller 114 often receives a false busy signal or ring and never contacts the PSAP facility 102 in an emergency. A malfunction in the 911 network during an emergency can be devastating.

To overcome this problem, 911 network backup systems have been developed that detect when a 911 caller attempts to contact a PSAP but fails to do so because of a malfunction in the 911 network. In response to the 911 call, these network backup systems reroute the call through other trunks or lines in the PTN, avoiding the severed cables, faulty tandem switches or malfunctioning C.O.

One known network backup system uses a pair of transceivers, a trunk diverter circuit 116 positioned proximate to a central office and a responder circuit 122, having its own PTN number, positioned proximate to the PSAP facility 102 (and/or proximate to the tandem switch 110). When the trunk diverter circuit 116 detects that a 911 call cannot reach its appropriate PSAP facility, this transceiver reroutes the 911 call by dialing the number of the responder circuit 122 through a PTN or cellular network route, and reroutes the 911 call through the newly established route.

After dialing a 911 call, the 911 caller 114 normally waits six to ten seconds from the last digit depressed on the telephone before the PSAP receives the call and the 911 caller hears a ringing signal. When the dedicated 911 network is malfunctioning and the network backup system is initiated, the 911 caller experiences this normal ten-second delay, plus additional setup time as the trunk diverter circuit 116 attempts to dial the responder circuit 122. This setup time can add up to nine seconds for a PTN route and up to forty seconds for a cellular route, even when the PTN/cellular trunks are not busy. If the trunks are busy, the network backup system would attempt to reroute the call through other preprogrammed routes, adding additional time to the 911 call.

In an attempt to compensate for these delays, the known network backup system provides several voice messages to the 911 caller informing them of the progress of their call, and hopefully keeping them on the line. During an emergency, the 911 caller may not stay on the line, or, if they do not understand the voice messages (e.g., the 911 caller does not understand English), the caller may hang up and attempt to redial. Again, the 911 call will be subject to the above delays as the network backup system attempts to reroute the new 911 call.

While the network backup systems reroute 911 calls when the 911 network malfunctions, these backup systems are subject to delays. These delays are significant for panicked emergency callers. Even if these emergency backup systems improve the speed of their performance, they are nevertheless subject to the delays inherent in the PTN and cellular networks.

Overall, the inventors are unaware of a 911 or other telecommunications network backup system that provides rapid response despite the delays inherent in PTN and cellular networks.

SUMMARY OF THE INVENTION

According to principles of the present invention, an instant network backup system reduces rerouting and call processing time after the dedicated communications network malfunctions. The present invention monitors and reroutes trunks to alternative paths after a network malfunctions, even before a caller places a call. The backup system of the present invention is particularly suited for dedicated 911 networks.

The backup system of the present invention determines before a 911 call occurs that the dedicated route to the PSAP is unavailable. The backup system begins to search for an available backup route to the PSAP immediately after determining that the dedicated route to the PSAP is unavailable. If the tandem switch malfunction such that a route cannot be established to the appropriate PSAP, or if the PSAP is unavailable, a route to an alternative PSAP is established. The backup system uses two transceivers, a trunk diverter circuit and a responder circuit. The trunk diverter circuit is installed in series between an outgoing 911 trunk from each possible originating central office. Each responder unit is preferably installed as close to the PSAP as possible, and connected in series with each backup line to the PSAP (e.g., each ground start line).

The backup system of the present invention locates and maintains communication with a responder circuit within the PTN or cellular networks whenever it determines that the dedicated 911 network is malfunctioning. In essence, the instant network backup system of the present invention locates and holds a PTN line between the trunk diverter circuit and the responder circuit; however, the responder circuit does not contact or "ring" the PSAP until the trunk diverter circuit receives a 911 call.

The trunk diverter circuit, after receiving a 911 call, contacts the responder circuit by instructing the responder circuit to ring the PSAP to which it is connected. When the PSAP answers, the responder circuit signals back with an "off hook" signal indicating that the 911 call can be connected through the responder circuit to the PSAP. Communications between the trunk diverter circuit and the responder circuit are discontinued and the route established therebetween is used by the 911 caller to access the PSAP.

The backup system establishes and maintains a signal path between the trunk diverter circuit and the responder circuit so that no additional setup time or rerouting time is necessary when a 911 call is received after the 911 network malfunctions. The backup system of the present invention passes 911 calls through the route established between the trunk diverter circuit and the responder circuit such that the 911 call appears to the 911 caller as a regular call with ringing, connect and disconnect common with most PTN telephone calls. The backup system essentially converts PTN and/or cellular networks to dedicated 911 trunks in the event of a 911 dedicated trunk path outage.

In a broad sense, the present invention embodies a system for maintaining a communications signal exchange between a first location and a telecommunications switching location over first or second telecommunication paths. The telecommunications switching location is coupled to a plurality of telephone transceivers and is capable of coupling one of the telephone transceivers to the first location upon receiving a predetermined request signal from the one telephone receiver. The system includes a first transceiver coupled to the second telecommunications path approximately at the first location and a second transceiver coupled to the first and second telecommunication paths at the telecommunication switching location. The second transceiver has a memory, a microprocessor or central processing unit ("CPU") coupled to the memory, and at least one coupling circuit intercoupling the CPU to the first and second telecommunication paths. The CPU monitors the first telecommunications path and exchanges signals with the first transceiver over the second telecommunications path when the CPU determines that the first telecommunications path is faulty. The CPU provides a second telecommunications path to the one telephone transceiver when the CPU receives the predetermined request signal.

The present invention also embodies a method of maintaining a signal exchange between first and second locations having first and second transceivers associated therewith. The first and second transceivers are selectively coupled for signal exchange about a signal path upon an initiation by the first transceiver. The method includes the steps of: (1) monitoring a first signal path between the first and second locations, (2) determining if the first signal path is disrupted, (3) establishing a second signal path between the first and second locations before the initiation by the first transceiver, (4) maintaining the second signal path, and (5) providing a second signal path to the first and second transceivers upon the initiation by the first transceiver.

The present invention solves problems inherent in the prior art by providing a network backup system for rapidly establishing a telecommunications link between two locations in a PTN or cellular network, despite the delays inherent in the PTN and cellular networks. Other features and advantages of the present invention will become apparent from studying the following detailed description of the presently preferred embodiment together with the following drawings.

DETAILED DESCRIPTION OF THE PRESENTLY PREFERRED EMBODIMENT

Figure 1A:
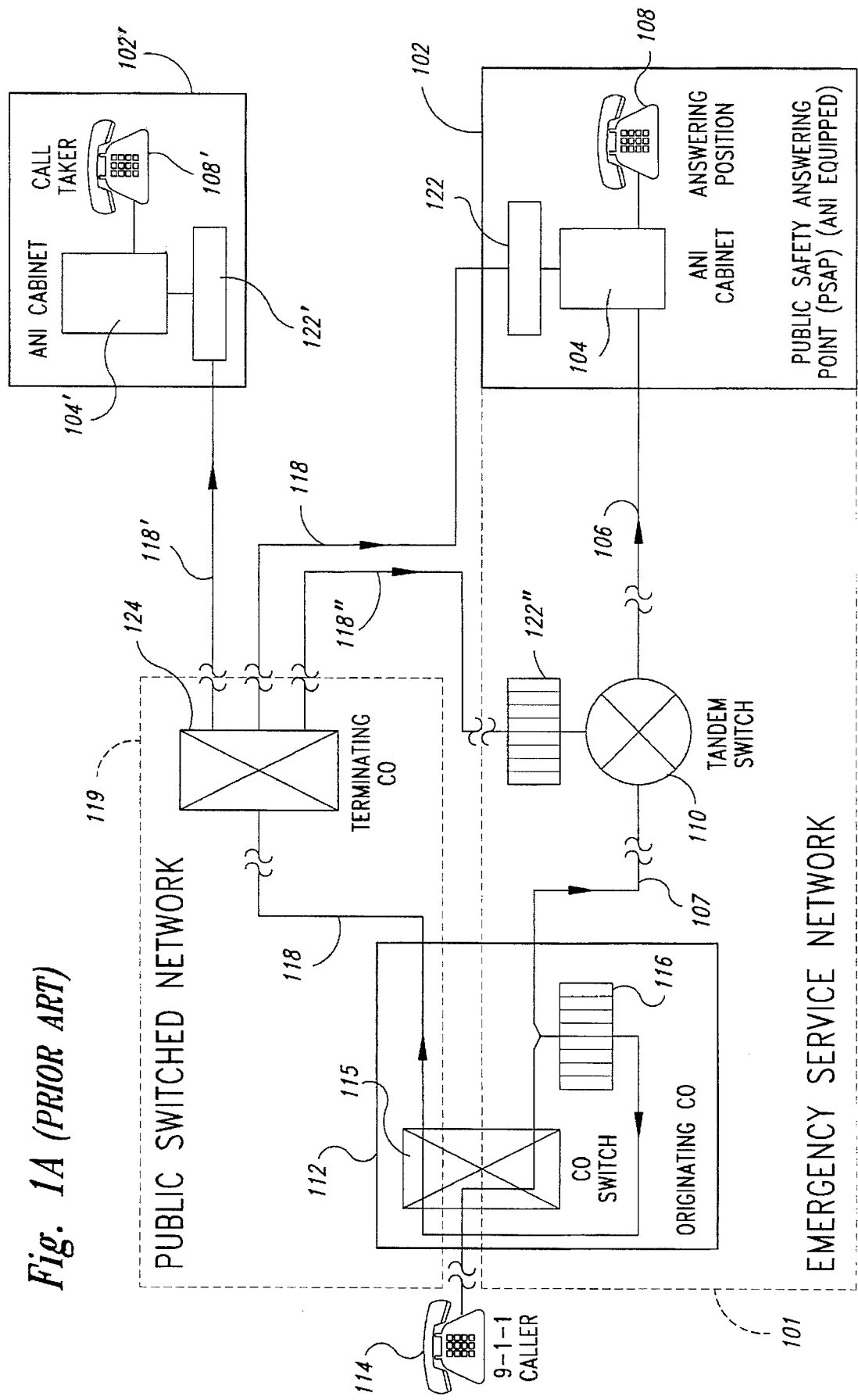
FIG. 1A is a block diagram of the prior art network backup system having a trunk diverter circuit and responder circuit.
Figure 1B:
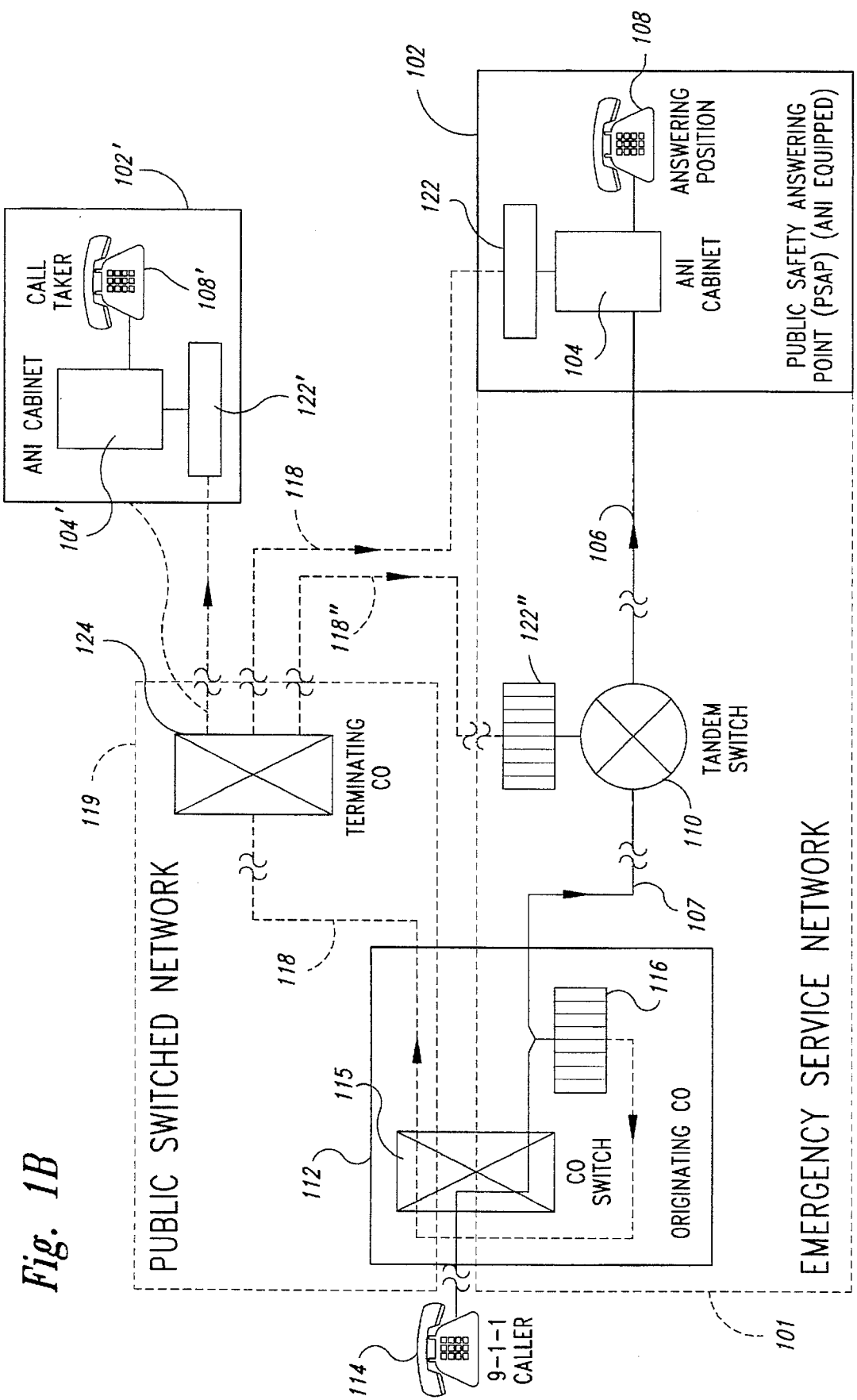
FIG. 1B is a block diagram of a communications network backup system under the present invention, having a trunk diverter circuit and responder circuit, shown coupled to an emergency telecommunications network, prior to a failure in the emergency telecommunications network.
Figure 1C:
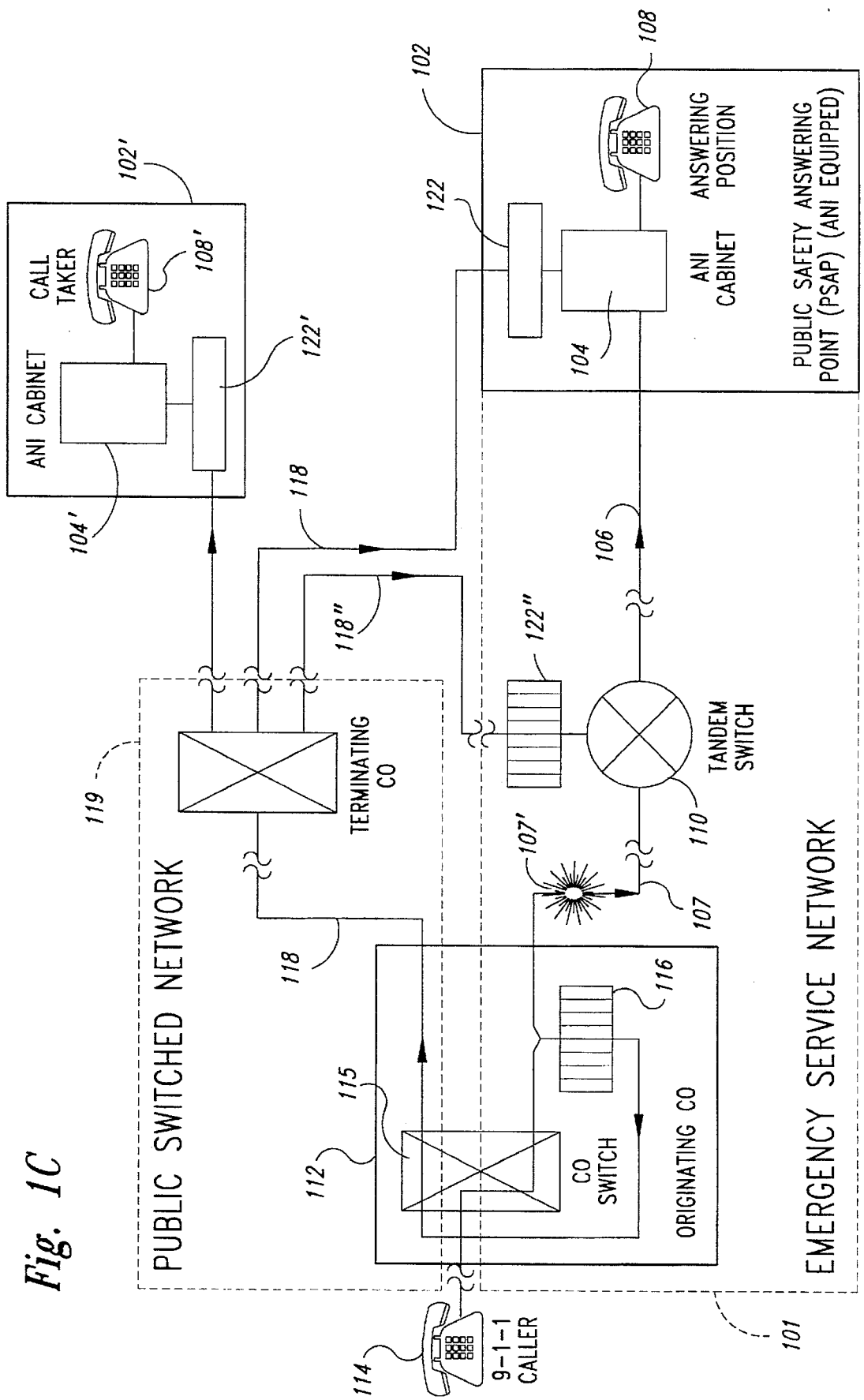
FIG. 1C is a block diagram of the communications network backup system of FIG. 1B, after a failure in the emergency telecommunications network.

Referring to FIGS. 1A through 1C, a typical emergency telecommunications service network 101, or "911 network" for handling emergency telephone calls includes a PSAP 102. An automatic number identification ("ANI") controller 104 in the PSAP facility 102 is coupled between an incoming 911 trunk 106 and an answering position 108. The ANI controller 104 receives and converts ANI signals to signals displayed on a visual display at the answering position 108 in order to identify the phone number of the party placing the 911 call. The answering position 108 includes a telephone transceiver and other facilities standard in PSAP facilities.

An emergency 911 caller, represented in FIGS. 1A–1C as a telephone 114, places a 911 call to the PSAP facility 102. A central office switch 115 in an originating C.O. 112 receives the 911 call and routes it to a tandem office or switch 110 by means of a tandem trunk 107. The tandem switch 110 in turn routes the 911 call to the PSAP facility 102 along the 911 trunk 106.

A trunk diverter circuit 116 is preferably coupled proximate to the originating C.O. 112 and in series with the tip and ring leads of the outgoing tandem trunk 107. This coupling configuration is used for loop reverse battery signaling trunks; however, the present invention is compatible with other configurations such as E&M signaling and four-wire trunks. The operation of these trunk types is well established in the prior art, and an explanation of their operation would not add to the understanding of the operation of the present invention. The present invention is described herein with respect to loop reverse battery signaling and two-wire trunks; those skilled in the relevant art will understand that the present invention may be readily adapted for other trunk signaling types based on the detailed description provided herein to produce the same results.

As described more fully below with respect to FIGS. 2A–2C, the trunk diverter circuit 116 monitors the tandem trunk 107 and the tandem switch 110 for malfunctions and reroutes 911 calls to the PSAP facility 102 through alternate paths before a 911 call is received. Thus, in the event of a malfunction, an alternative route for the 911 call is ready and immediately available when the 911 call is placed. A responder circuit 122 is coupled to the ANI controller 104 in the PSAP facility 102. When the trunk diverter circuit 116 detects a trunk 107 or tandem switch 110 failure, the trunk diverter circuit 116 establishes an alternate path or route 118 through the PTN 119 to reroute 911 calls to the PSAP facility 102. While the alternative path 118 is generally shown and described (and used interchangeably) herein as a single ground start line circuit 118 established through the PTN 119, the path includes numerous connections along trunks and lines and may be established along other networks such as cellular networks as will be described more fully below.

The trunk diverter circuit 116 contacts and then exchanges communications with the responder circuit 122 in the PSAP facility 102 through the alternative path 118 in the PTN 119, from the originating C.O. 112 to a terminating C.O. 124. Preferably, responder circuits 122 are installed in each PSAP facility 102 and at each tandem switch 110. If the preferred PSAP facility 102 is unavailable, the trunk diverter circuit 116 establishes a second alternate path 118' from the terminating C.O. 124 to another responder circuit 122' installed at an alternate PSAP facility 102'. Alternatively, the trunk diverter circuit 116 can establish a third alternate path 118" to another responder circuit 122" installed proximate to the tandem switch 110. Each additional responder circuit 122 installed within the telecommunications networks (including the 911 network 101 and the PTN 119) further ensures that an alternative path to an available PSAP facility can be established under the present invention.

Figure 2A:
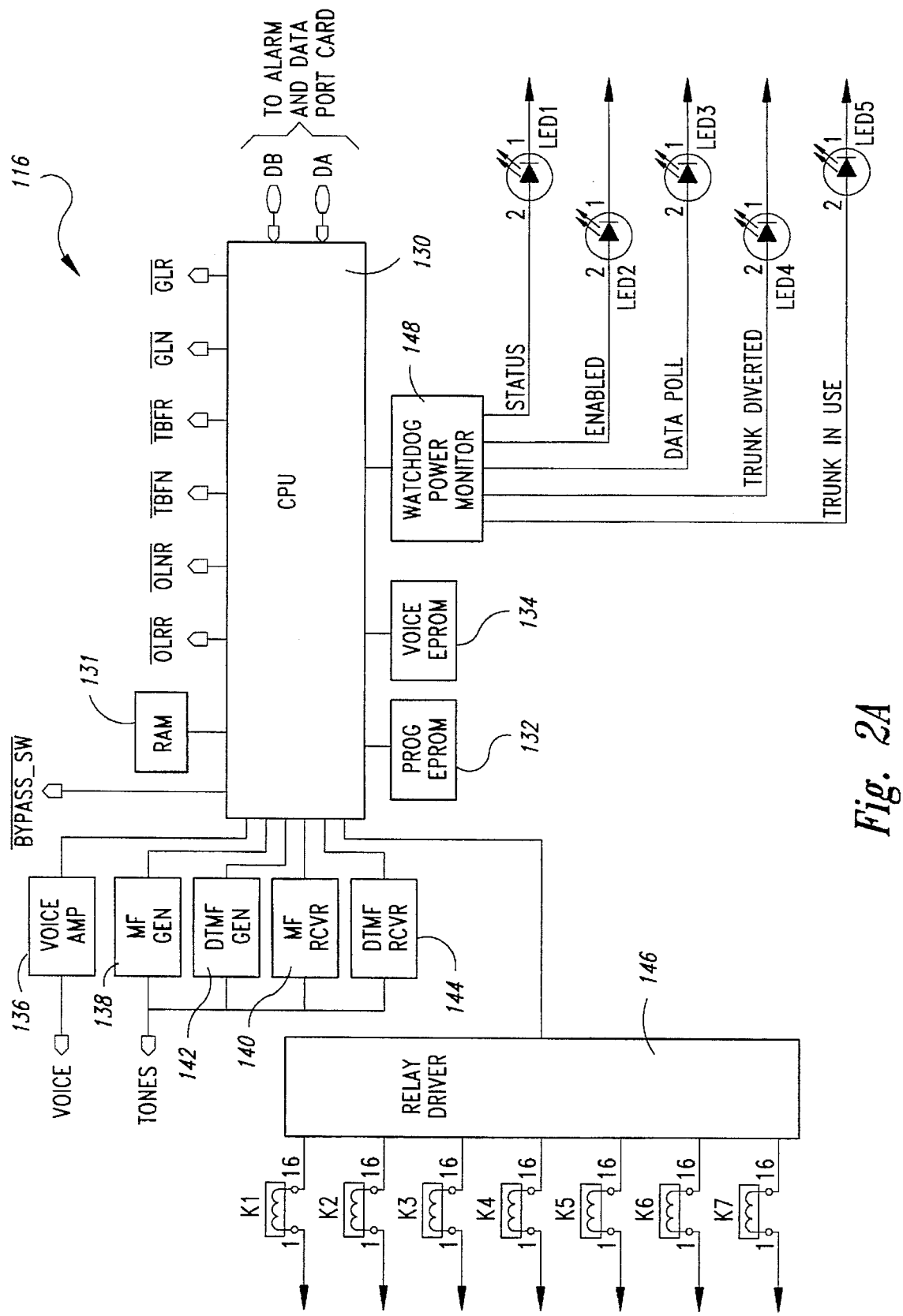
FIGS. 2A, 2B, and 2C are partial block, partial schematic diagrams of the trunk diverter circuit of FIGS. 1B and 1C.

Referring to FIG. 2A, the trunk diverter circuit 116 includes a microprocessor or central processing unit ("CPU") 130 for performing most of the tasks of the trunk diverter circuit 116. A random access memory ("RAM") 131 is coupled to and provides temporary storage for the CPU 130. An electrically programmable read-only memory ("EPROM") 132, coupled to the CPU 130, stores the instant backup routine performed by the CPU that is described more thoroughly below. A voice EPROM 134 and a voice amplifier 136, both coupled to the CPU 130, respectively store voice messages, and interpret, amplify, and provide these messages to the originating 911 caller 114 though the originating C.O. 112. A multi-frequency ("MF") generator 138 and an MF receiver 140 coupled between the CPU 130 and the tandem trunk 107 preferably receive MF signals from the trunk and provide MF signals to the ANI controller 104 via the responder circuit 122. Similarly, a dual-tone multi-frequency ("DTMF") generator 142 and a DTMF receiver 144 are coupled between the CPU 130 and the alternative path 118 (i.e., the ground start line). As is known by those skilled in the art, MF signaling is used for trunk-to-trunk communications (e.g., between the originating C.O. 112 and the terminating C.O. 124) while DTMF signaling is used for communications over lines in most PTNs (e.g., between the originating C.O. 112 and the 911 caller 114).

A series of light emitting diodes LED 1–LED 5, coupled to the watchdog power monitor 148, provide an indication of the status of the trunk diverter circuit 116. The table below summarizes what each LED indicates when it is illuminated.

| LED Number | Indication |
| --- | --- |
| LED 1 | Trunk diverter 116 is powered up |
| LED 2 | Trunk diverter 116 is disabled from rerouting calls |
| LED 3 | Data being transmitted from the CPU 130 to the alarm and data port card |
| LED 4 | Call diverted from trunk |
| LED 5 | 911 call in progress |

A relay driver 146 is coupled to the CPU 130 drives relays K1–K7 in the trunk diverter circuit 116, as will be described more fully below. A watchdog power monitor 148, also coupled to the CPU 130, monitors and adjusts the power input to the CPU. The CPU 130 is coupled to an alarm and data port card (not shown) that provides alarm signals to the originating C.O. 112 and records various conditions within the 911 network 101 and the PTN 119. The alarm and data port card also provides inputs for an operator to adjust or modify the trunk diverter circuit 116, and is thus not necessary to the routine operation of the trunk diverter circuit 116. The trunk diverter circuit 116 also preferably includes a diverter switch (not shown) that allows the operator to disable the instant network backup system of the present invention if so desired by the operator.

Figure 2B:
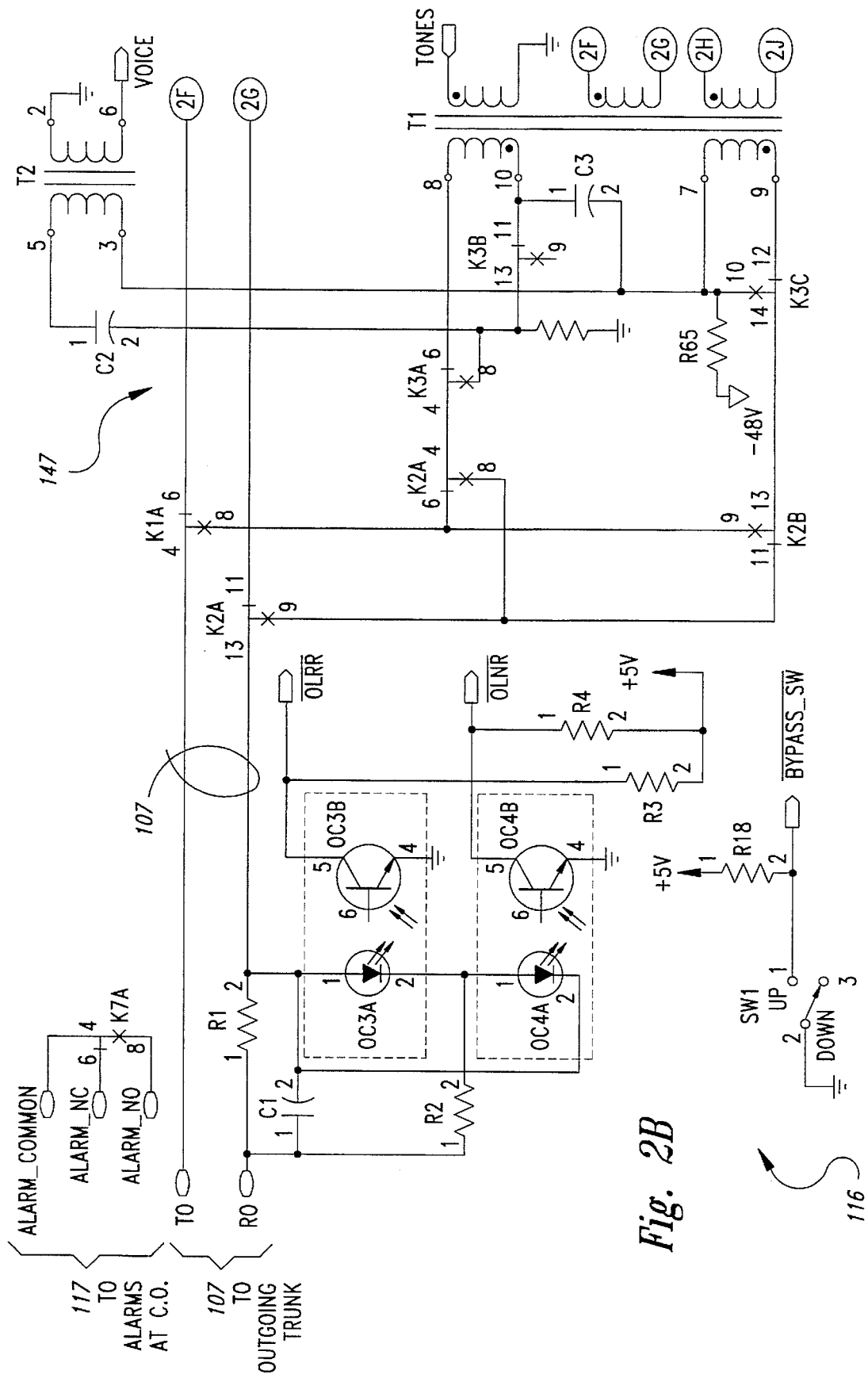
Figure 2C:
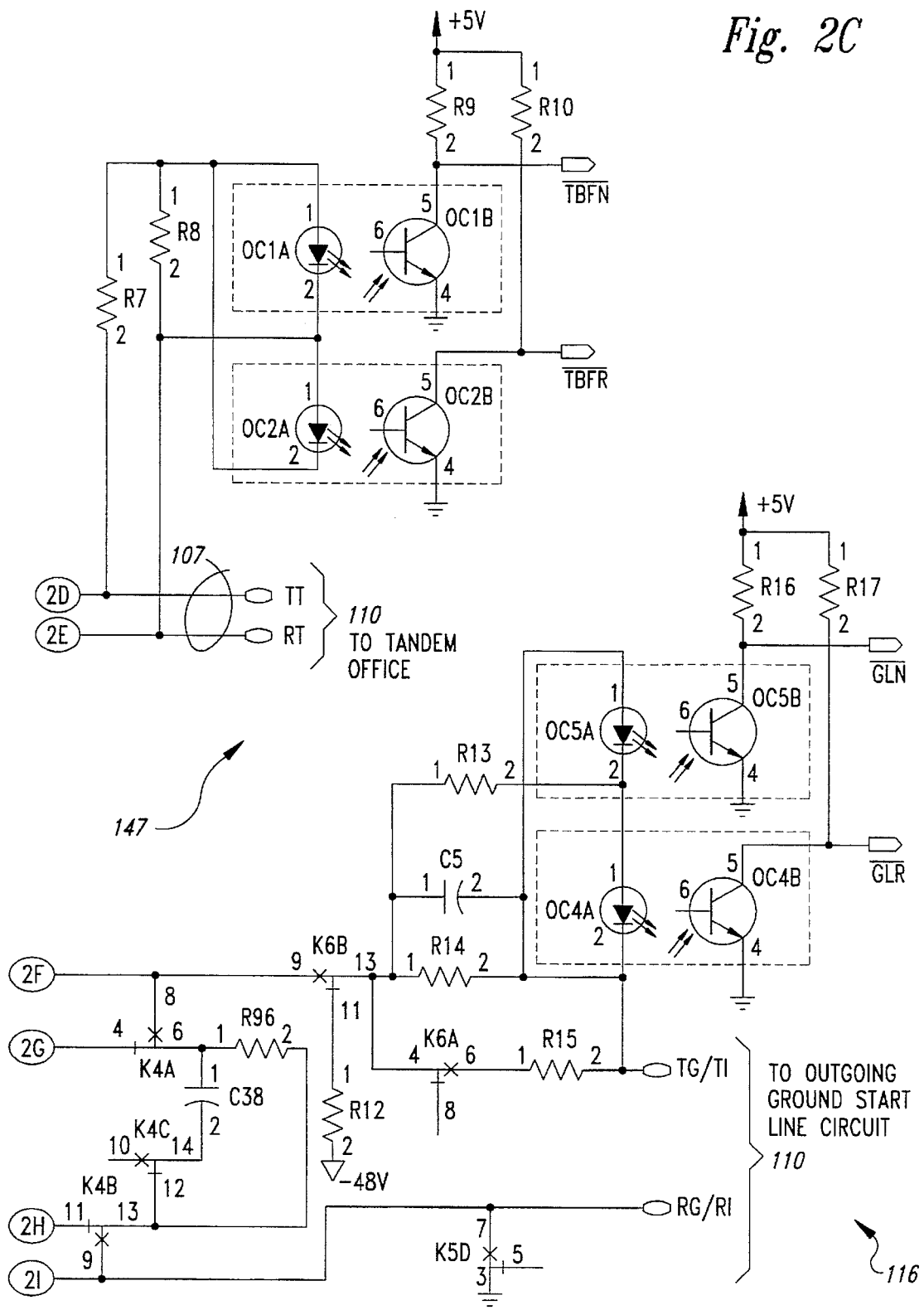

With reference to FIGS. 2B and 2C, coupling and switching circuitry 147, intercoupling the CPU 130 with the tandem trunk 107 includes optical couplers OC1 and OC2, and OC3 and OC4 that passively monitor the tip and ring leads of the incoming and outgoing tandem trunk, respectively, and provide signals to the CPU 130. Similarly, optical couplers OC5 and OC6 are coupled to the outgoing ground start line 118 for the same purpose. The relays K1 through K7 (FIG. 2B) provide various switching features, including splitting the tandem trunk 107 and diverting it to the outgoing ground start line 118, as will be discussed more fully below. As shown in FIGS. 2B and 2C, each optical coupler preferably includes a light-emitting diode (e.g., OC1A), and a phototransistor (e.g., OC1B). Similarly, each relay generally provides two or more switching functions, for example, relay K1 provides switching functions to the tip end ring leads of the tandem trunk 107 at switch points K1A and K1B, respectively. A pair of transformers T1 and T2 inductively couple the outgoing 911 trunk 107 to the outgoing ground start line 118 and allow the CPU 130 to inductively transmit and receive voice and tone signals therefrom. A pair of transformers are used, rather than a single transformer, to allow the CPU 130 to transmit voice messages to the originating C.O. 112 and thus to the 911 caller 114 as the CPU simultaneously transmits tones to the C.O. or ANI controller 104 (via the responder circuit 122).

Figure 3A:
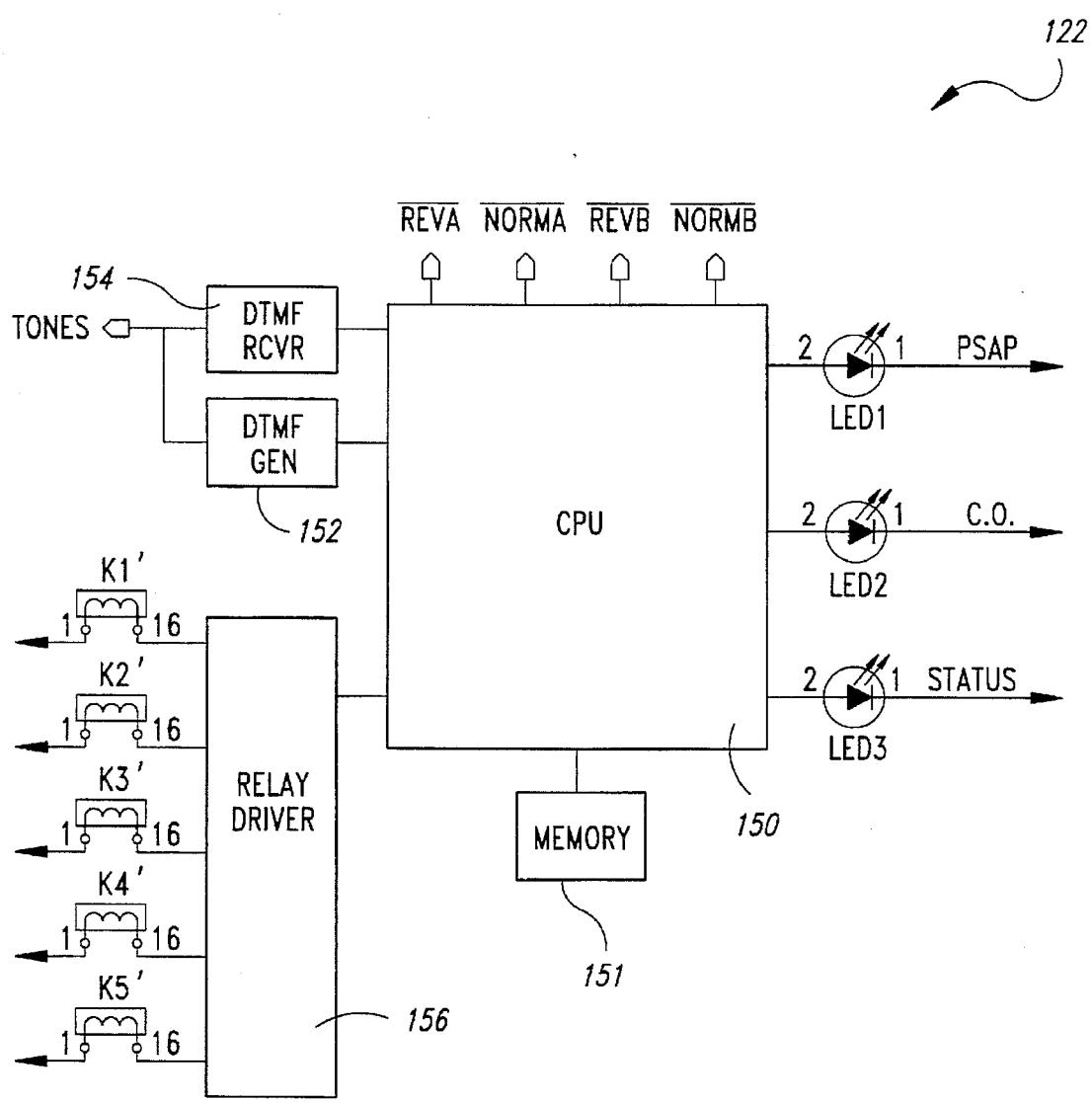
FIGS. 3A, 3B, and 3C are partial block, partial schematic diagrams of the responder circuit of FIGS. 1B and 1C.

Referring to FIG. 3A, the responder circuit 122 includes a CPU 150 for performing most of the tasks of the responder circuit 122. A memory 151 provides storage for the instant network backup routine and other data for the CPU 150. A DTMF generator 152 and a DTMF receiver 154, coupled between the CPU 150 and the incoming ground start line 118 from the terminating C.O. 124 (FIGS. 1B and 1C), provide and receive DTMF signals from the ground start line 118. A relay driver 156 coupled to the CPU 150 drives relays K1'–K5' in the responder circuit 122.

Figure 3B:
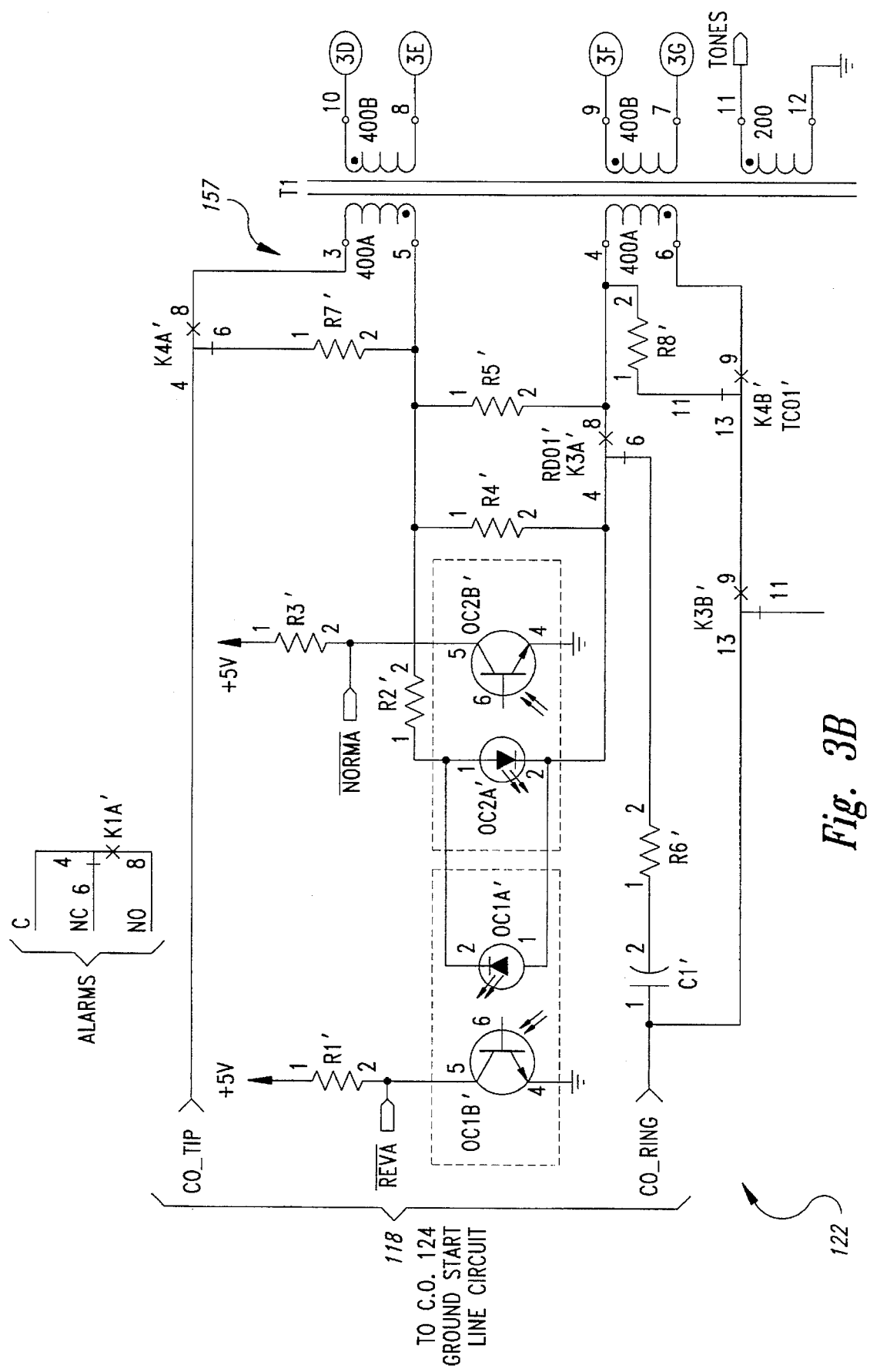
Figure 3C:
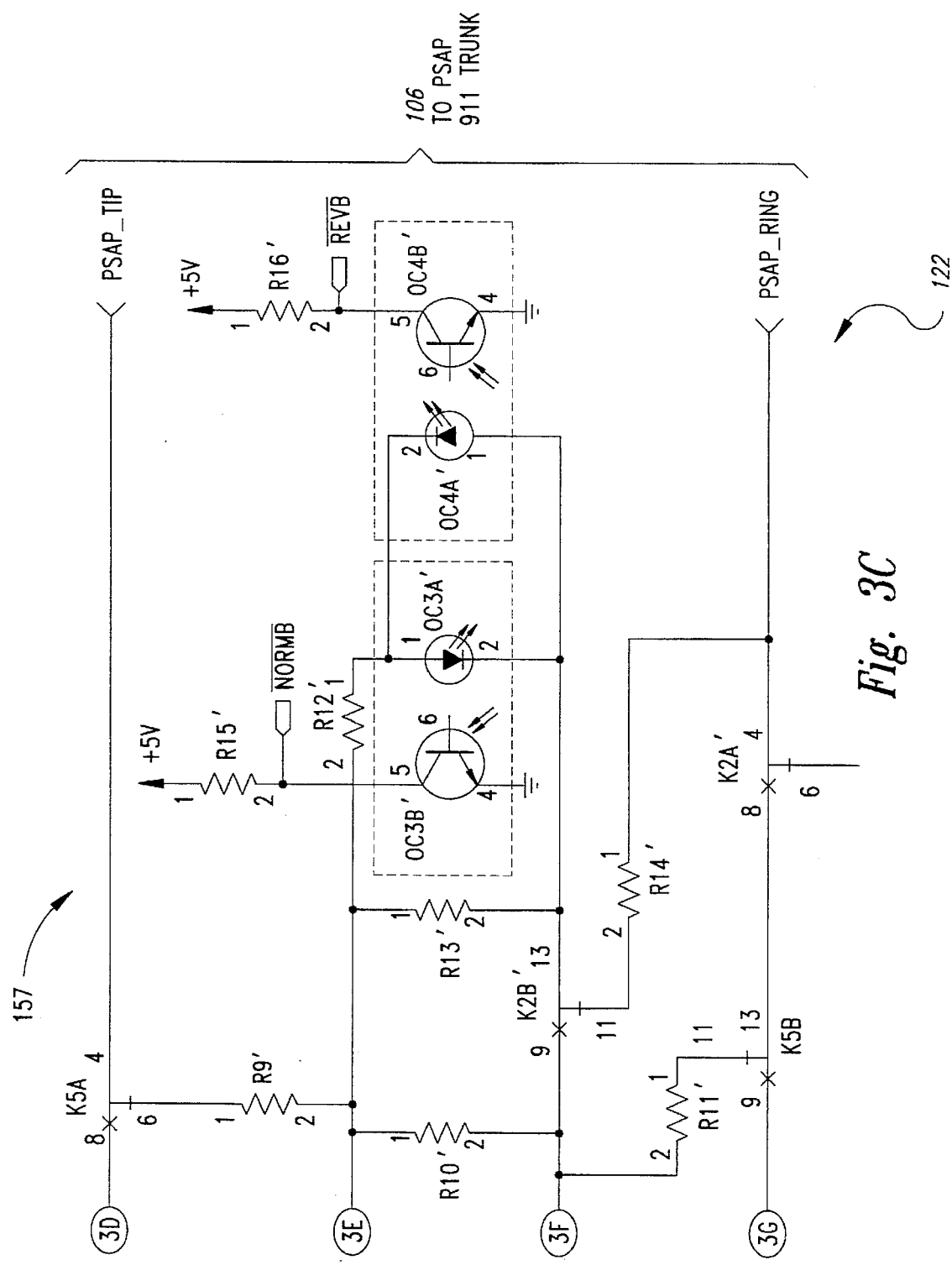

Referring to FIGS. 3B and 3C, coupling and switching circuitry 157, intercoupling the CPU 150 with the PSAP's 911 trunk 106 and the ground start line 118, includes optical couplers OC1 and OC2, and OC3 and OC4, that passively monitor the ground start line 118 and the PSAP 911 trunk 106, respectively, and provide signals to the CPU 150. A transformer T1 inductively couples the ground start line 118 to the PSAP's 911 trunk 106 and allows the CPU 150 to inductively transmit and receive DTMF tones thereto and therefrom.

Referring back to FIG. 1B, before a malfunction is detected in the 911 network 101, the trunk diverter circuit 116 and the responder circuit 122 are not intercoupled. However, as shown in FIG. 1C, after the trunk diverter circuit 116 detects a malfunction in the 911 network 101 (shown as a cable break 107'), the trunk diverter circuit and one of the responder circuits 122, 122' or 122" exchange communications therebetween and establish an alternate path 125 for a 911 caller 114, as described below.

Referring now to FIGS. 4–10, an instant network backup routine 200 is shown that establishes and maintains a communication link between the trunk diverter circuit 116 and the responder circuit 122 when the 911 network 101 malfunctions. As noted above, the appropriate portions of the routine 200 are stored as software in non-volatile memory (EPROM 132 and memory 151) of the trunk diverter circuit 116 and the responder circuit 122, to be executed by the CPUs 130 and 150, all respectively. After the trunk diverter circuit 116 initializes itself, the instant network backup routine 200 begins in FIG. 4, the "top chart", with a start step 202. Following the start step 202, the routine 200 proceeds to step 203 where a trunk monitor routine (shown in FIG. 5) is called.

Figure 4:
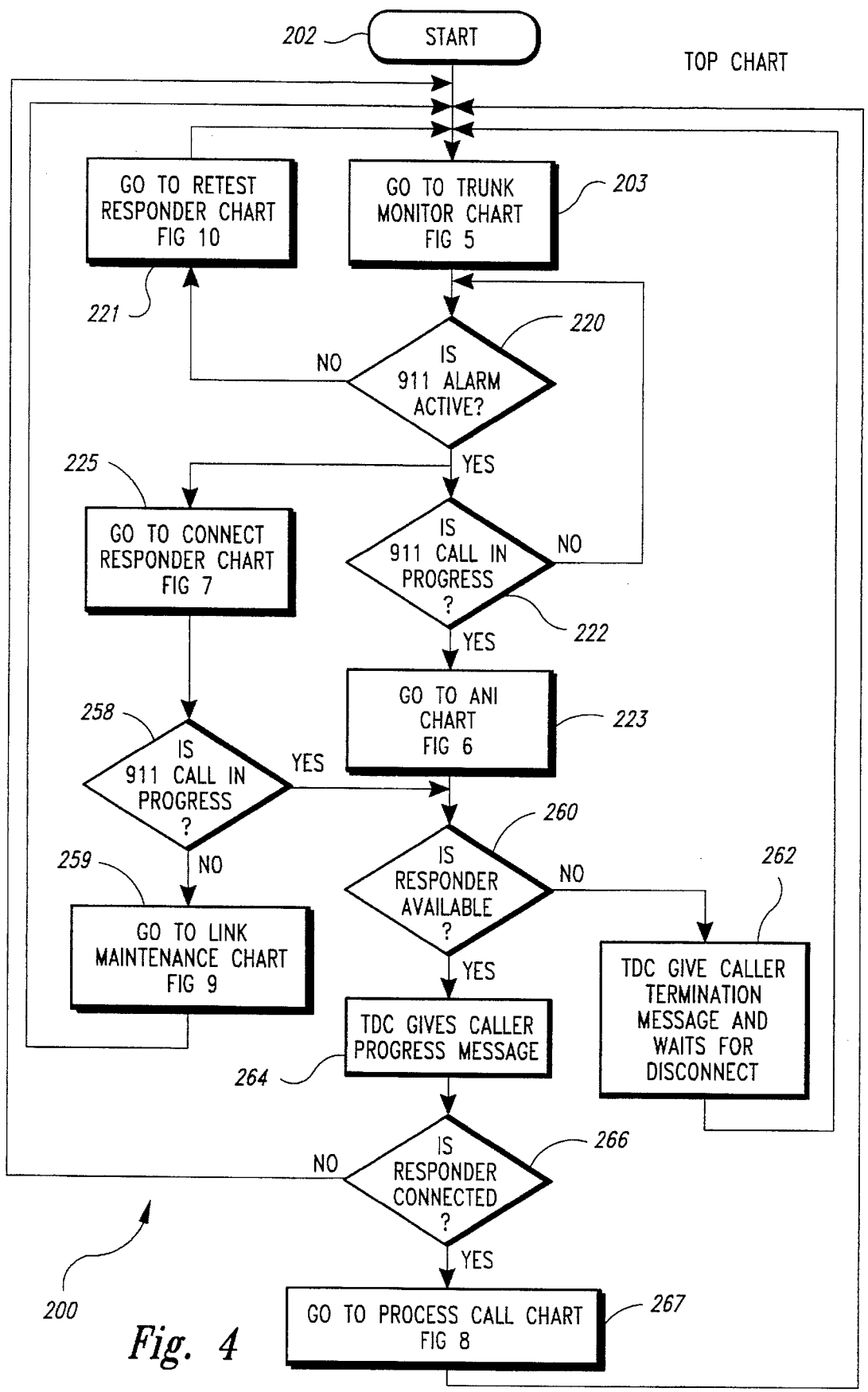
FIGS. 4, 5, 6, 7, 8, 9 and 10 are flow charts of a method under the present invention of rapidly backing up a malfunction in a communications network, the method preferably being implemented as software executed by the communications network backup system of FIGS. 1B and 1C.
Figure 5:
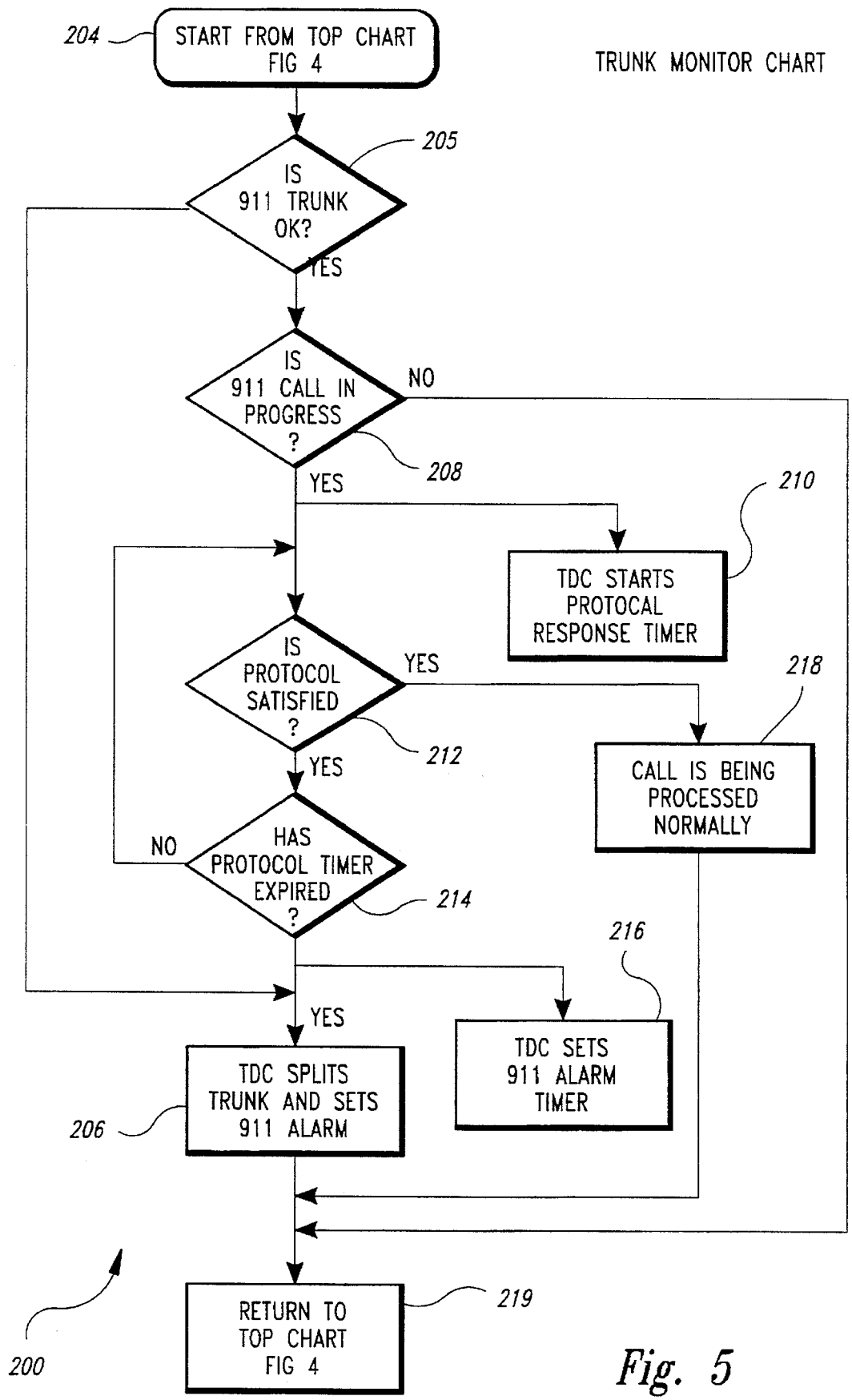

Referring to FIG. 5, the CPU 130 enters the trunk monitor routine at step 204, and in step 205, monitors the tandem trunk 107 to determine if the trunk is acceptable for exchanging communication thereon. The CPU 130 monitors the tip and ring leads of the tandem trunk 107 through optical couplers OC1, OC2, OC3 and OC4, and detects for normal polarity on the exemplary loop reverse battery signaling trunk. If the CPU 130 determines that the tandem trunk 107 is unacceptable for transmission of signals thereon, i.e., has improper or incorrect polarity, the CPU in step 206 splits the tandem trunk from the tandem switch 110 by providing an appropriate signal to the relay driver 146 which in turn actuates relay K1. Concurrently, the CPU 130 provides an appropriate signal to the relay driver 146 which in turn operates the relay K7 to provide an alarm signal to the originating C.O. 112, notifying personnel at the C.O. that a malfunction is occurring. The CPU 130 in step 206 also provides appropriate data signals to the alarm and data port card. Following step 206, the routine 200 returns to exit step 203 in FIG. 4.

If, in step 204, the tandem trunk 107 is acceptable for data communications, the CPU 130 determines in step 208 whether a 911 call is in progress by detecting a normal current flow through the optical coupler OC3. If a 911 call is not in progress in step 208, the routine 200 returns back to the steps in FIG. 4.

If the CPU 130 determines in step 208 that a 911 call is in progress, then in step 210, the CPU 130 begins a protocol timer and waits for a response from the tandem switch 110. In step 212, the CPU 130 determines if the tandem switch 110 responds with an appropriate switching protocol, and if so, then the routine 200 returns to the steps in FIG. 4, because the 911 call is being processed normally. The CPU 130 determines in step 212 that the protocol is satisfied and that the tandem switch 110 responded properly by detecting, through optical coupler OC4, that a reversed current is flowing through the tandem trunk 118.

If the CPU 130 determines at step 212 that the appropriate switching protocol has not yet been satisfied, it checks at step 214 to determine if the protocol timer started at step 210 has expired. If so, the CPU 130 splits the tandem trunk 107 from the tandem switch 110 and provides an alarm by activating relays K1 and K7, respectively, in step 206, as described above. Concurrently, the CPU 130 sets an 911 alarm timer in step 216.

The present invention is able to detect both malfunctions in the 911 network 101 caused by a severing of a trunk line or a malfunction in various communication equipment. For example, if the tandem trunk 107 is severed, the CPU 130 detects abnormal polarity on the tandem trunk 107 in step 204. The trunk diverter circuit 116 establishes the alternative path 118 until the tandem trunk 107 is repaired and the CPU 130 detects normal polarity on the trunk.

If, however, the tandem trunk 107 appears to be operating normally (i.e., normal polarity is detected), but other telecommunications equipment is malfunctioning, then the CPU 130 fails to receive the proper protocol signals within the specified protocol time period in step 214. The trunk diverter circuit 116 cannot determine when the malfunctioning telecommunications equipment is repaired, and therefore, the trunk diverter circuit establishes the alternative path 118 for a predetermined time period established by the 911 alarm timer in step 216 (e.g., 20 to 60 minutes).

If the CPU 130 receives the protocol within the specified time period, the 911 call is coupled to the PSAP facility 102, and the call is processed in its usual fashion in step 218. Following steps 206 or 218, the routine 200 returns, via step 219, to exit step 203 in FIG. 4, and then determines if the 911 alarm is active in step 220. If the 911 call is being processed normally and thus, the 911 alarm is not active, the routine 200 calls a retest responder routine, shown in FIG. 10, at step 221, as will be described below.

If, however, the 911 alarm was found to be active in step 206, then the CPU 130 determines in step 222 whether a 911 call is in progress. If a 911 call is in progress, then the routine 200 calls an ANI routine, shown in FIG. 6, at step 223. Concurrently, since the 911 alarm was found to be active in step 220, the routine 200 also calls a connect responder routine, shown in FIG. 7, at step 225. While the two processes shown in FIGS. 6 and 7 are discussed herein separately, they are instead performed concurrently by the CPUs 130 and 150 of the trunk diverter circuit 116 and responder circuit 122.

Figure 6:
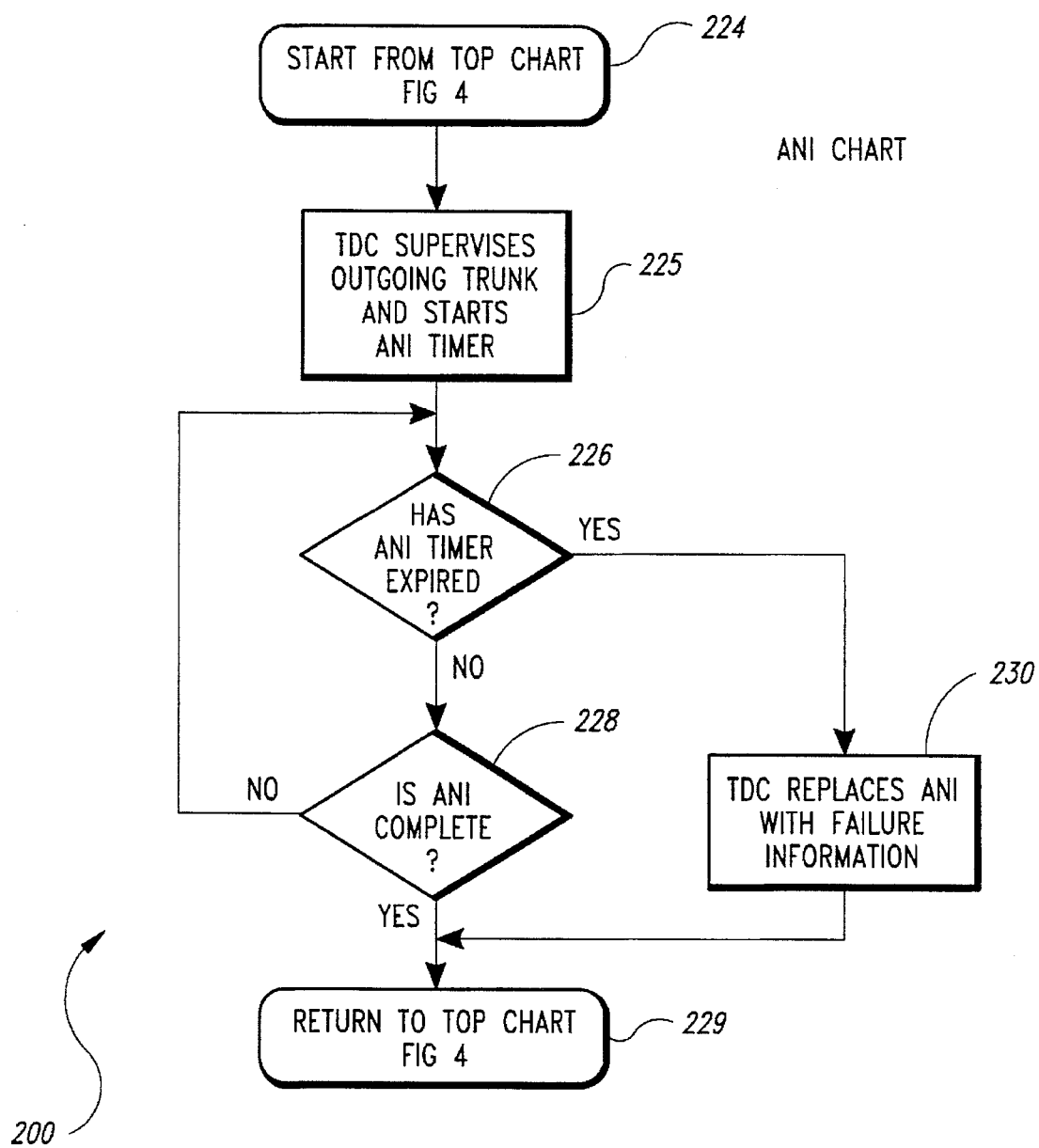

Referring now to FIG. 6, the CPU 130 enters the ANI routine at step 224 and, in step 225, provides an appropriate signal to the relay driver 146 which in turn momentarily operates the relay K2. This momentary operation of the relay K2 provides a request signal to the originating C.O. 112 over the outgoing 911 trunk 107 instructing the originating C.O. to transmit the 911 caller's ANI data. Concurrently, at step 225, the CPU 130 starts an ANI timer. The CPU 130 receives the ANI data through the transformer T1 and the MF receiver 140 and stores it in the RAM 131 for subsequent processing. If the instant network backup system of the present invention is installed in a multiple numbering plan area and the backup route 118 is to a responder circuit 122 located in a PSAP facility 102, then the CPU 130 replaces the "info digit" received with the ANI data with a "numbering plan digit." The ANI data with either the info digit or the numbering plan digit are supplied to the PSAP facility 102 as described below.

In step 226, the CPU 130 determines if the ANI timer has expired, and if not, in step 228 determines whether the complete ANI signal has been received. If the timer has not expired and the ANI signal has not been completely received, the routine 200 loops back; however, if the ANI timer is found to have expired in 226, the CPU 130 in step 230 replaces the ANI data with appropriate data indicating that a request for ANI information had failed. Following the ANI request steps in FIG. 6, the routine 200 returns via step 229 to exit step 223 in FIG. 4.

Figure 7:
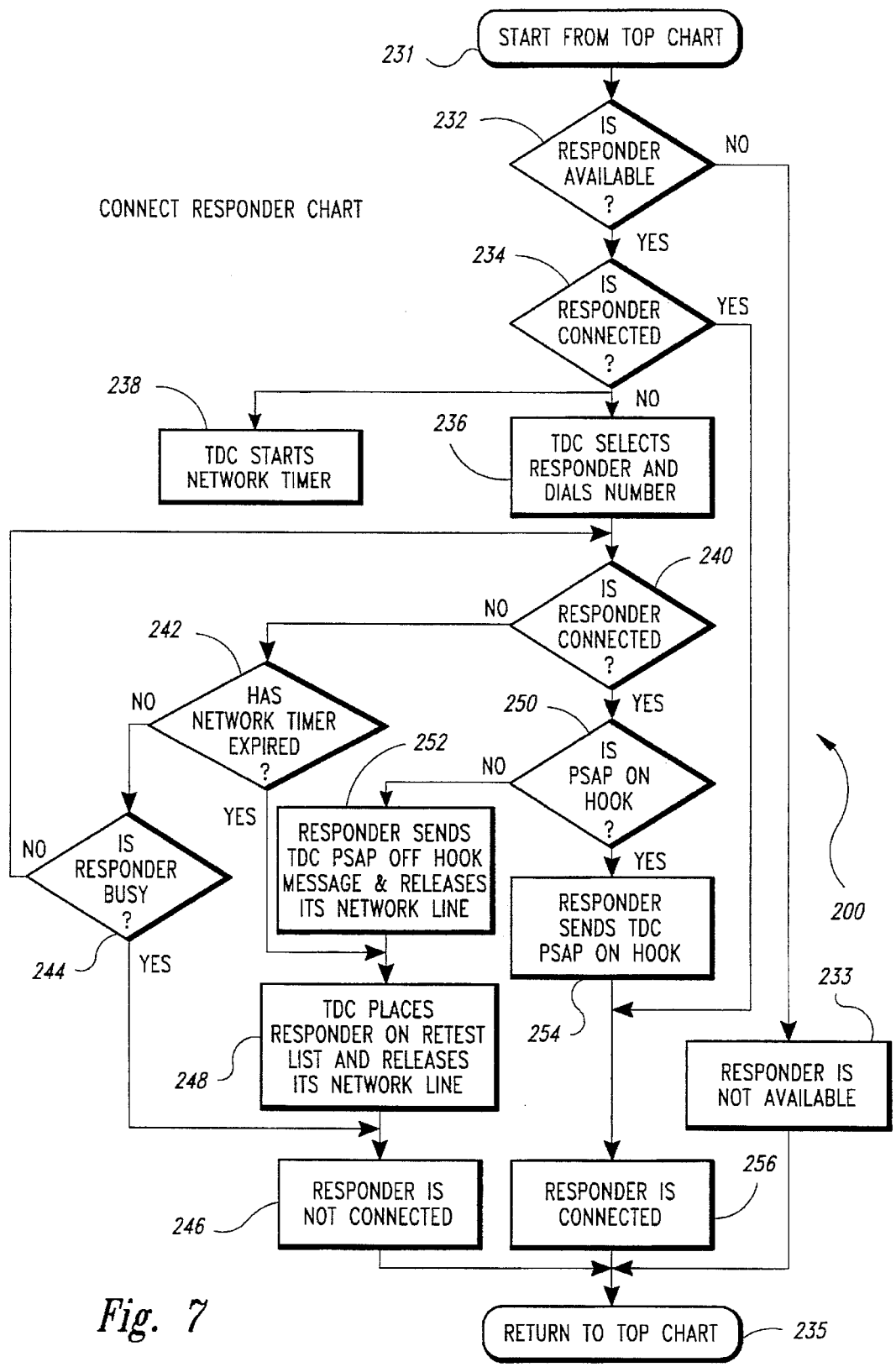

Referring now to FIG. 7, the CPU 130 enters the Connect Responder routine at step 231 and determines in step 232 whether one of several responder circuits 122 installed in the 911 network 101 and PTN 119 are available. The CPU 130 preferably maintains a "TDC's responder database" in the RAM 131. The TDC's responder database includes a list of those responder circuits 122 to which the trunk diverter circuit 116 presently has access and can communicate. If the CPU determines in step 232 that all the responder circuits 122 in the TDC's responder database are inaccessible, the routine 200 sets a Responder Not Available flag at step 233 and then returns to the steps in FIG. 4 via step 235.

If at least one responder circuit 122 listed in the TDC's responder database is found to be available at step 232, then in step 234, the CPU 130 determines whether a responder circuit 122 is already connected to the outgoing ground start line 118. If a responder circuit 122 is already connected to the trunk diverter circuit 116, the routine 200 sets a Responder Connected flag at 256 before exiting through step 235 and returning to the steps in FIG. 4.

If one of the responder circuits 122 is available but currently unconnected, the CPU 130 executes step 236 by causing the relay driver 146 to actuate the relay K5 and seize the outgoing ground start line 118 in preparation of dialing the PTN number of an available responder circuit 122 selected from the TDC's responder database. The PTN numbers of all of the responder circuits 122 in the TDC's responder database are stored in the RAM 131.

The CPU 130 monitors the outgoing ground start line 118 through the optical couplers OC5 and OC6 to determine when the outgoing ground start line circuit has been seized. When the CPU 130 monitors the proper response from the outgoing ground start line 118, the CPU actuates the relay K6 and releases the relay K5 through the relay driver 146. The CPU 130 then transmits the PTN number of the selected responder circuit 122 to the ground start line 118 by providing an appropriate signal to the DTMF generator 142. The DTMF generator 142 also provides the appropriate tones of the PTN number to the outgoing ground start line 118 through the transformer T1 in step 236.

Concurrently with the execution of step 236 as described above, the CPU 130 starts a Network Timer in step 238. Thereafter, the CPU 130 checks at step 240 to determine if the responder circuit 122 is connected. If the responder circuit 122 is found at step 240 to be not connected, the CPU 130 checks at step 242 to determine if the network timer started at step 238 has expired. If not, the CPU 130 checks at step 244 to determine if the called responder circuit 122 is busy. If the called responder circuit 122 is not busy, the CPU returns to step 240 to once again determine if the called responder circuit has connected. By looping through steps 240, 242, and 244, the CPU 130 waits until the time out of the Network Timer started at 238 for the called responder circuit to answer. If the called responder circuit 122 is busy, then the CPU 130 branches from step 244 to step 246 where a Responder Not Connected flag is set before exiting through step 235. If the called responder circuit 122 does not answer before the Network Timer expires, the CPU 130 branches from Step 242 to execute step 248 by indicating in the TDC's responder database that the selected responder circuit 122 is unavailable and is to be retested later. Thereafter, the CPU 130 releases that particular PTN ground start line 118, and sets the Responder Not Connected flat at step 246 before returning back to the steps in FIG. 4.

If the selected responder circuit 122 is found to be connected in step 240, then in step 250, the CPU 130 determines if the responder circuit is "on hook" in step 250. As is currently known by those skilled in the relevant art, the term "off hook" refers to a PTN connection or path that is unavailable because it is in use, while the term "on hook" refers to an available connection or path within the PTN. Referring to FIGS. 3A through 3C, the responder circuit's CPU 150 monitors the tip and ring leads of the PSAP's 911 trunk 106 through the optical couplers OC3' and OC4'. As is known by those skilled in the art, a loop reverse battery signaling trunk, such as the exemplary 911 trunk 107, is determined to be on hook or off hook from the side attempting to seize the trunk when either a high or low impedance is measured on the trunk, respectively. Similarly, as measured from the side providing power to the trunk, an off hook condition is determined by a reversal of the normal polarity. Therefore, if the CPU 150 determines that the polarity of the tip and ring leads for the PSAP 911 trunk 106 is reversed (i.e., off hook), the CPU actuates the relay K1' by means of the relay driver 156 to thereby provide the PSAP facility 102 with an appropriate alarm signal.

The CPU 150 detects the incoming telephone call from the trunk diverter circuit 116 by monitoring the ground start line 118 from the terminating C.O. 124 through the optical couplers OC1' and OC2'. Once the CPU 150 detects ringing on the ground start line 118, the CPU seizes the ground start line by operating the relay K3' through the relay driver 156. Following actuation of the relay K3', the PTN 119 makes an audio connection between the responder circuit 122 and the trunk diverter circuit 116. The CPU 150 determines that the audio connection has been made by monitoring current flow through the ground start line 118, and operates the relay K5', through the relay driver 156.

Referring back to FIG. 7, if the CPU 150 determines at step 250 that the PSAP is "off hook," the responder circuit 122 then releases the relay K3' to restore the C.O. ground start line 118 to an idle state in step 252. Additionally, in step 252, the CPU 150 of the responder circuit 122 transmits a "PSAP Off Hook" message signal to the trunk diverter circuit 116, by means of the DTMF generator 152 through the transformer T1', to the trunk diverter circuit 116 over the ground start line 118. In response thereto, the CPU 130 of the trunk diverter circuit 116 in step 248 indicates in the TDC's responder database that the selected responder circuit 122 is unavailable and is to be retested, as explained above. In step 246 the CPU 130 then sets the Responder Not Connected flag at step 246, and the routine 200 returns back to the steps in FIG. 4. Alternatively, if the PSAP is found at step 250 to be on hook, the CPU 150 of the responder circuit 122 provides a "PSAP On Hook" message signal to the trunk diverter circuit 116. In response thereto, the CPU 130, in step 256, sets the Responder Connected flag and exits through step 235 to return back to the steps in FIG. 4.

Referring back to FIG. 4, the CPU 130 determines in step 258 whether a 911 call is in progress. If so, the CPU 130 determines again if any responder circuits 122 are available in step 260. The responder circuit 122 called in the steps of FIG. 7 could have been the only available responder circuit in the TDC's responder database and if so, no other responder circuits are available. If no responder circuits 122 are found to be available in step 260, then the CPU 130 retrieves an appropriate voice message from the voice EPROM 134 in step 262. The voice message is transmitted through the voice amplifier 136, the transformer T2 and the outgoing 911 trunk 118 back to the 911 caller 114. An appropriate message to the 911 caller 114 would be a voice message informing the caller that his or her call cannot be connected to a PSAP facility followed by a busy signal. The CPU 130 in step 262 also waits for the 911 caller 114 to disconnect and makes the outgoing 911 trunk 107 idle (as discussed above). Thereafter, the routine 200 returns to the steps in FIG. 5.

If the CPU 130 determines in step 260 that a responder circuit 122 is available, then the CPU retrieves another appropriate message from the voice EPROM 134 and provides this message to the 911 caller 114 indicating the progress of his or her call, in step 264 (e.g., a message that the call is being rerouted and that he or she is to remain on the line). In step 266, the CPU 130 determines whether a responder circuit 122 is connected to the trunk diverter circuit 116. If no responder circuit 122 is currently connected, then the routine 200 loops back to monitoring the tandem trunk 107 under the steps shown in FIG. 5 and continues through the steps described above until either (1) a responder circuit 122 is connected in step 256 (FIG. 7), (2) no responder circuit 122 listed in the TDC's responder database can be connected (steps 232 and 260), or (3) the 911 caller 114 disconnects and the 911 call is no longer in progress.

Figure 8:
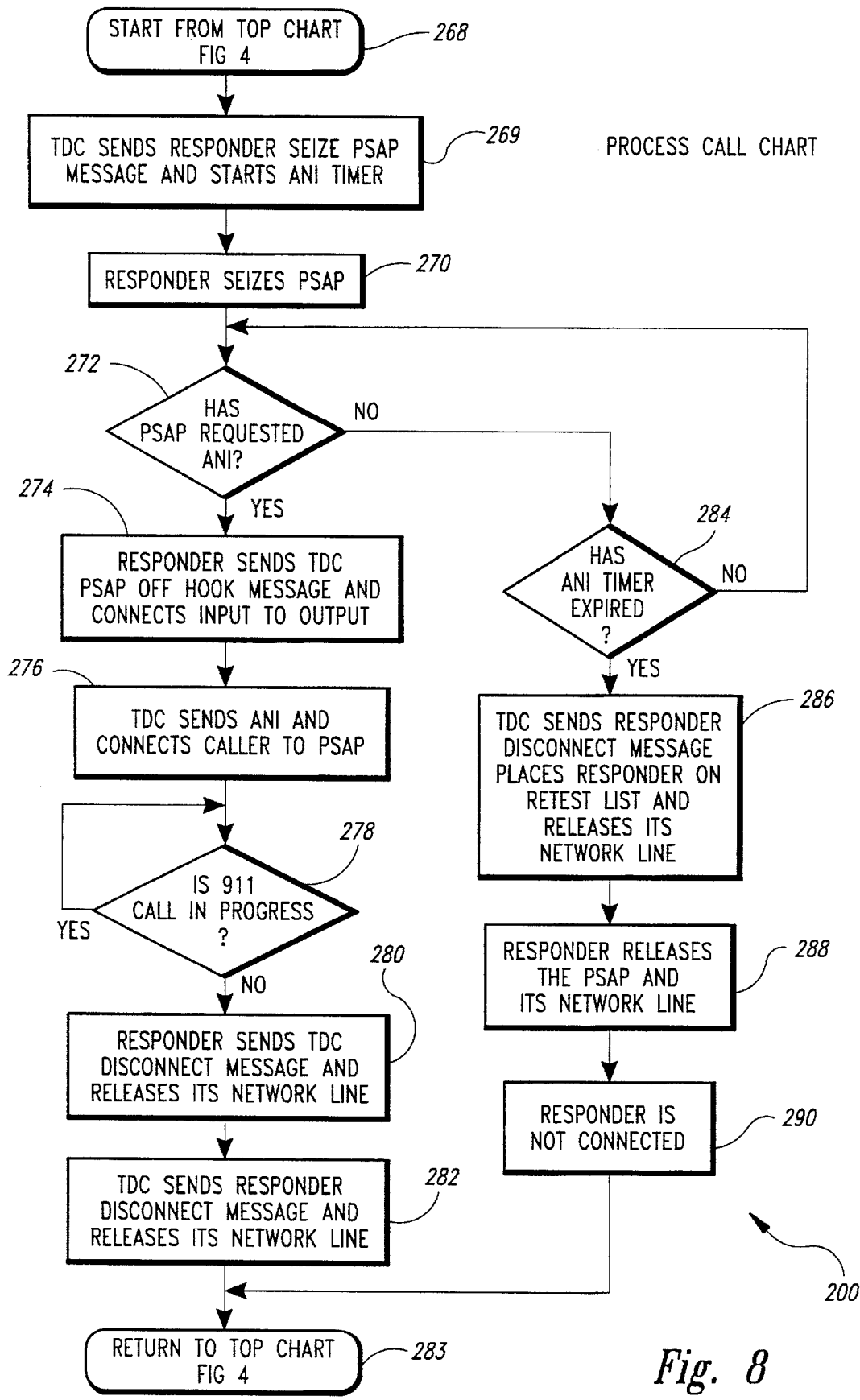

If the CPU 130 determines in step 266 that the selected responder circuit 122 is connected, then the routine 200 exits via step 267 to a process call routine shown in FIG. 8. Referring to FIG. 8, the CPU 130 enters the routine at 268 and, at step 269, sends the responder circuit 122 a seize PSAP message by providing an appropriate signal to the DTMF generator 142, which in turn provides the seize PSAP message to the outgoing ground start line 118 via the transformer T1. Concurrently, at step 269, the CPU 130 starts an ANI timer. In step 270, the CPU 150 of the responder circuit 122 receives the seize PSAP message via its transformer T1' and DTMF receiver 154. In response thereto, the CPU 150 actuates the relay K2', through the relay driver 156 to thereby seize the 911 trunk 106. In step 272, the CPU 150 monitors the 911 trunk 106 through the optical couplers OC3' and OC4' to determine if the PSAP facility 102 provides a request for an ANI signal.

When the CPU 150 receives the request for an ANI signal from the PSAP facility 102, the CPU 150 sends the PSAP off hook message to the trunk diverter circuit 116 via its DTMF generator 152 and transformer T 1' at step 274. The CPU 150 also activates the relay K5' to connect its input to its output and allow the trunk diverter circuit 116 to communicate with the PSAP facility 102 in step 274. In step 276, the CPU 130 retrieves the ANI data stored in RAM 131 and transmits it to the PSAP facility 102 by means of the MF generator 138. Also in step 276, the trunk diverter circuit 116 restores the relay K3, thereby connecting the trunk diverter circuit's inputs to its outputs, connecting the 911 caller 114 to the PSAP facility 102 so that an operator at the PSAP facility may speak with the 911 caller.

The CPU 150 of the responder circuit 122 monitors the progress of the 911 call in step 278 by determining whether it detects a network disconnect signal via the optical couplers OC1' and OC2', and OC3' and OC4', indicating that the 911 caller 114 or the PSAP facility 102 has disconnected, respectively. Similarly, during the 911 call, the CPU 130 of the trunk diverter circuit 116 monitors for the PSAP on hook message from the responder circuit 122 on the outgoing ground start line 118 or a disconnect signal from the outgoing 911 trunk 107 from the originating C.O. 112 (indicating that the 911 caller 114 has disconnected), through the optical couplers OC3 and OC4, and OC5 and OC6, respectively. If the responder circuit 122 detects a disconnect signal, then in step 280 it sends the trunk diverter circuit 116 a disconnect message over the ground start line 118. The responder circuit 122 also restores its inputs and outputs to idle at step 280 by releasing the appropriate relays (i.e., releases its PTN line). Alternatively, if the trunk diverter circuit 116 detects a disconnect signal, then in step 282 it sends the responder circuit 122 a disconnect message. Thereafter, the trunk diverter circuit 116 restores its inputs and outputs to idle. After the trunk diverter circuit 116 and the responder circuit 122 release their PTN lines (represented herein as the ground start line 118 shown in FIG. 1), the routine 200 exits through step 283 to the steps in FIGS. 4 and 5, and the circuits wait for the next 911 call.

If the CPU 130 determines in step 272 that the PSAP facility 102 has not requested the ANI data, and the ANI timer is found to have expired in step 284, the CPU 130 recognizes that communications with the PSAP facility are disrupted. Consequently, the CPU 130 sends the responder circuit 122 a disconnect message in step 286. The CPU 130 also indicates in the TDC's responder database that that particular responder circuit 122 is unavailable, in step 286, and the CPU releases its outgoing ground start line 118 by deactivating the relay K6. The responder circuit 122, in response to the disconnect message from the trunk diverter circuit 116, releases its ground start line 118 and the 911 trunk 106 by deactivating the relays K3' and K2' in step 288. The Responder Not Connected flag is set at 290 and the routine 200 returns via step 283 to the steps in FIGS. 4 and 5. The routine 200 continues through the preceding steps until either the 911 call is processed through a responder circuit 122, the 911 call terminates (e.g., the 911 caller 114 disconnects) or the trunk diverter circuit 116 cannot connect to any responder circuits (i.e., no responder circuits are available).

Figure 9:
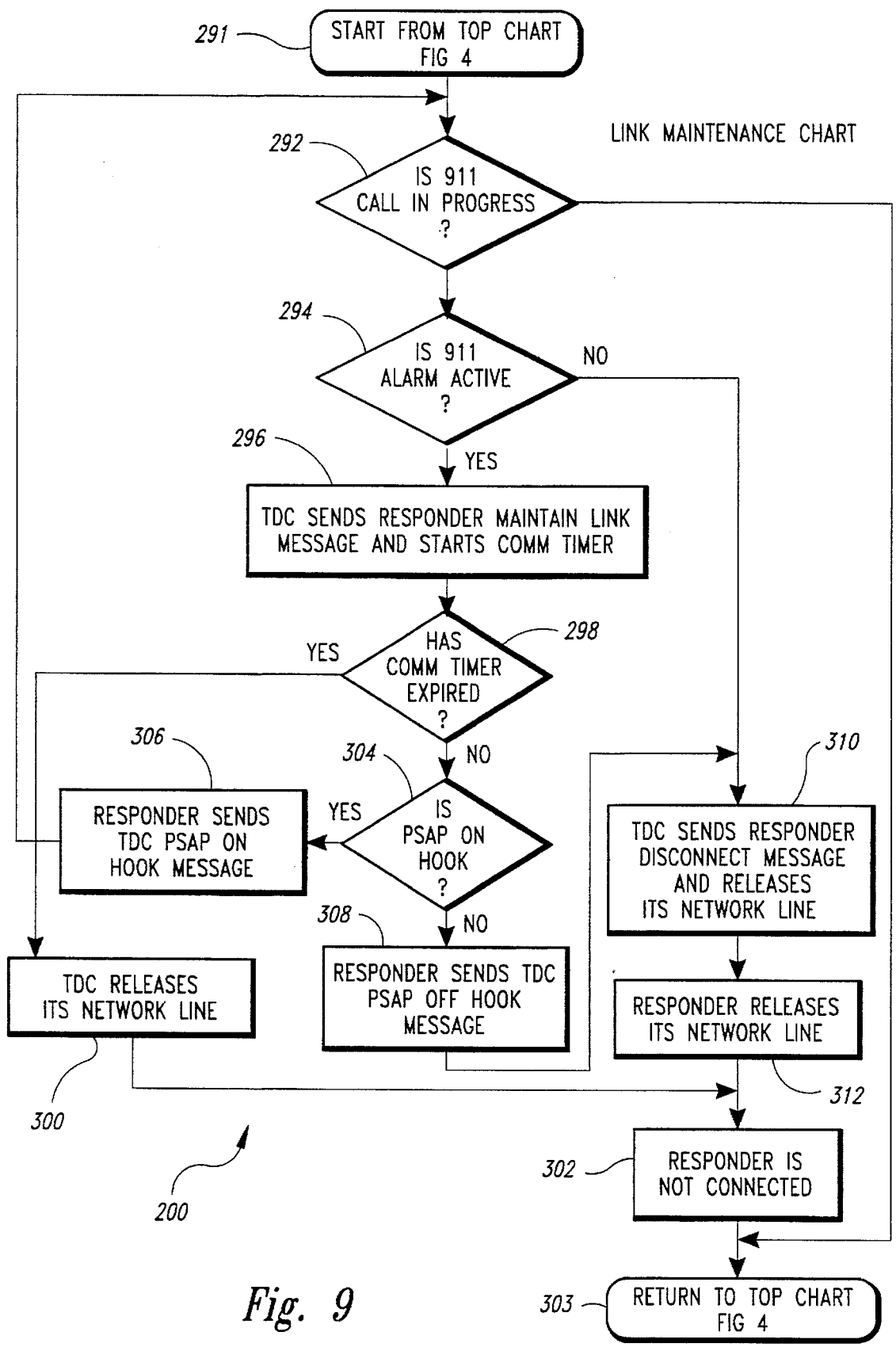

Referring back to FIG. 4, the routine is entered if the 911 alarm is found to be still active in step 220 because the 911 tandem trunk 118 is unacceptable for signal transmission or because the 911 alarm timer has not expired since the last 911 call has been diverted, and the CPU 130 determines in step 258 that a 911 call is not in progress, the routine 200 calls a link maintenance routine shown in FIG. 9 at step 259.

The link maintenance routine shown in FIG. 9 is entered at step 291, and, if a 911 call is found to be not in progress in step 292 and the 911 alarm set in step 206 (FIG. 5) is found to be still active in step 294, the CPU 130 of the trunk diverter circuit 116 begins a communication timer and transmits a maintain link message to the responder circuit 122 in step 296. The maintain link message indicates to the responder circuit 122 that it should maintain its connection to the PTN 119 but not seize the PSAP facility 102. In response to the maintain link message, the responder circuit 122 transmits the PSAP on hook message to the trunk diverter circuit 116 if the PSAP facility 102 is available. The responder circuit 122 and the trunk diverter circuit 116 continue to exchange their respective PSAP on hook and link maintenance messages in a "ping pong" signaling manner along the alternate path 118 until: (1) the trunk diverter circuit 116 receives a 911 call, (2) the responder circuit 122 monitors an off hook signal from the PSAP facility 102, (3) the CPU 130 no longer recognizes a 911 alarm because it monitors an acceptable condition on trunk 118, or (4) the PTN connection between the trunk diverter circuit 116 and the responder circuit 122 is disrupted.

The communication timer sets a fixed period of time in which the responder circuit 122 has to transmit either the PSAP on hook or off hook message to the trunk diverter circuit 116. If the trunk diverter circuit 118 has not received either the PSAP on hook or PSAP off hook messages within this set time period, the PTN connection between the trunk diverter circuit and the responder circuit 122 could be disrupted, the responder circuit could be malfunctioning, or some other malfunction could be occurring. Therefore, until the communication timer has expired in step 298, the CPU 130 checks at step 304 to determine if the PSAP is on hook and, until the PSAP is off hook, then the responder circuit 122 sends the trunk diverter circuit 116 the PSAP on hook message in step 306 and the routine 200 loops back to determining if a 911 call is in progress in step 292 and if the 911 alarm is active in step 294. The 911 alarm was previously set in either steps 204 and 206 or 214, 216 and 206 of FIG. 5. If a 911 call is not in progress in step 292 and the 911 alarm is active in 294, the trunk diverter circuit 116 sends the responder circuit 122 the maintain link message and the routine 200 continues to loop through steps 298, 304, 306, 292, 294, and 296, in the ping pong signaling exchange described above. Once the Communication Timer has been found to have expired at step 298, the trunk diverter circuit 116 releases its PTN line (i.e., the ground start line 118) in step 300. The CPU 130 then sets a Responder Not Connected flat at 302 before returning to the steps of FIG. 4 via step 303. If the communications timer has not expired in step 298, the CPU 150 of the responder circuit 122 determines if the PSAP facility 102 is on hook in step 304, as explained above.

The loop of the routine 200, where the trunk diverter circuit 116 and the responder circuit 122 exchange messages, is terminated in step 292 whenever a 911 call is received. The routine 200 thereafter returns via step 303 to the steps shown in FIG. 4, and the 911 call is processed as described above. Importantly, the 911 call is routed to the PSAP facility 102 without the normal delay inherent in the PTN 118 (i.e., up to ten seconds) or other delays. No voice messages indicating the status of the 911 call are necessary because the 911 caller 114 perceives a standard 911 call, rather than a call that has been rerouted to the PSAP facility 102.

If the 911 alarm is found to be no longer active in step 294, or after the responder circuit 122 sends the trunk diverter circuit 116 a PSAP off hook message in step 308, the trunk diverter circuit sends the responder circuit the disconnect message and the trunk diverter circuit releases its PTN line in step 310. The responder circuit 122 then releases its PTN line in step 312. The CPU 130 thereafter determines that the responder circuit 122 is no longer connected in step 302 (and logs an appropriate an availability flag in the TDC's responder database), and the routine 200 returns through step 303 to the steps shown in FIG. 4.

Figure 10:
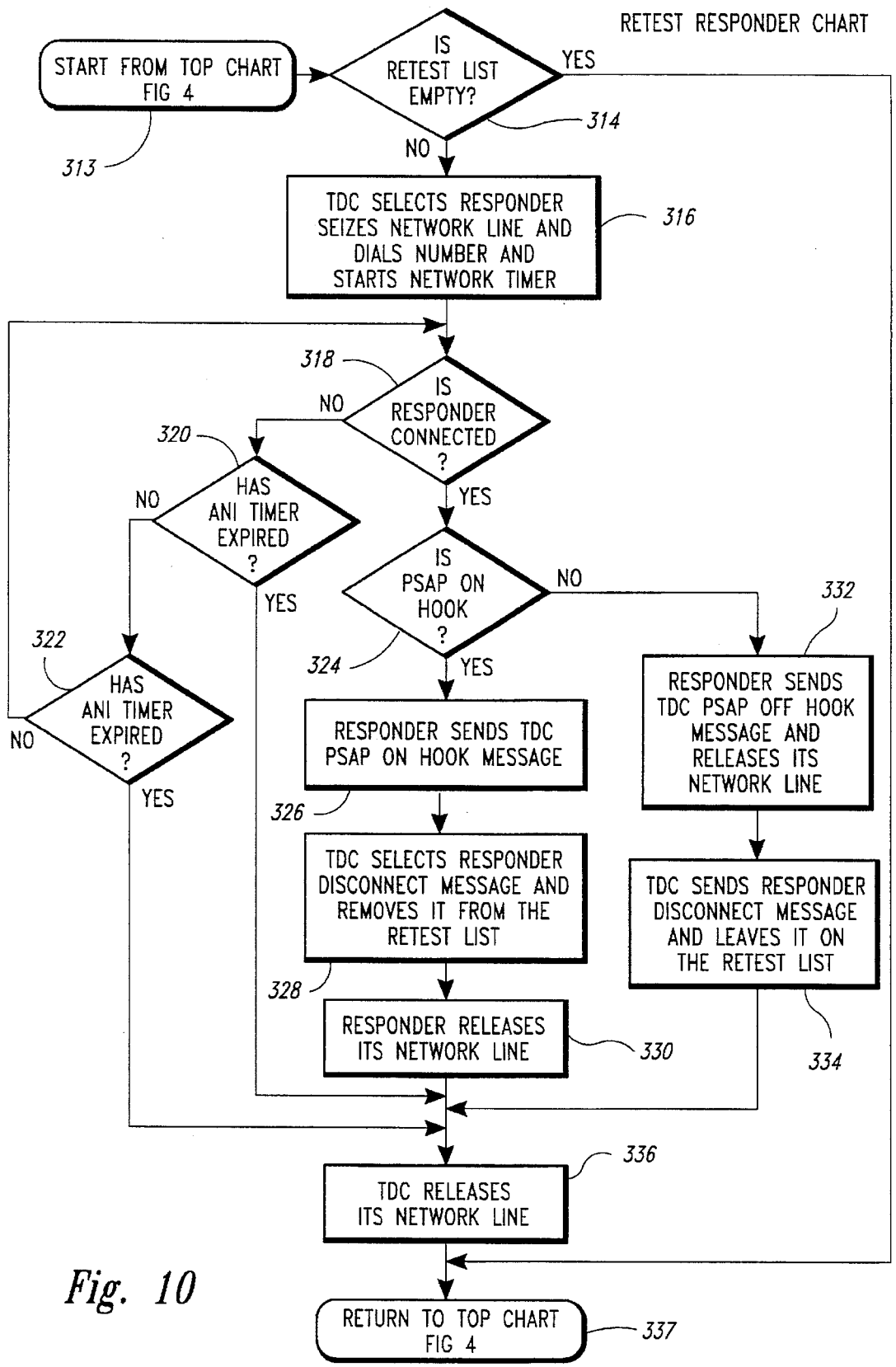

Referring back to FIG. 4, if the 911 alarm is found to be no longer active in step 220, the routine 200 calls at step 221 the retest responder routine shown in FIG. 10. Referring to FIG. 10, after starting the routine at step 313, the CPU 130 determines in step 314 if a retest list is empty. The retest list is a list compiled from the TDC's responder database that indicates those responder circuits 122 that previously were indicated or flagged as being unavailable. If the retest list is not empty, the CPU 130 selects the first responder circuit 122 on the list to test and retrieves its particular PTN number from the EPROM 132 in step 316. The trunk diverter circuit 116 seizes its outgoing ground start line 118 as described above and dials the PTN number of the selected responder circuit 122 by means of its DTMF generator 142 in step 316. Concurrently, the CPU 130 starts a network timer.

In step 318, the CPU 130 determines if the selected responder circuit 122 is connected. If the responder is not connected and the CPU 130 does not receive a busy signal from the selected signal 122 in step 320, the CPU then determines whether the network timer has expired yet in step 322. If the network timer has not yet expired in step 322, the CPU 130 continues to wait until the responder circuit 122 is connected in step 318.

If the responder circuit is connected in step 318, the CPU 150 of the responder circuit 122 determines if the PSAP facility 102 to which it is connected is on hook in step 324. If the responder circuit 122 determines that the PSAP facility 102 is on hook, the responder circuit sends the trunk diverter circuit 116 a PSAP on hook message in 326. In response to the PSAP on hook message, the trunk diverter circuit 116 sends the responder circuit 122 a disconnect message in step 328. The CPU 130 of the trunk diverter circuit 116 also removes that particular responder circuit 122 from the retest list and indicates in the TDC's responder database that it is an available responder circuit. In response to the disconnect message, the responder circuit 122 releases its PTN line in step 330.

If the responder circuit 122 determines in step 324 that the PSAP facility 102 is off hook, then in step 332, the responder circuit sends the trunk diverter circuit 116 a PSAP off hook message. The responder circuit 122 also releases its PTN line. In response to the PSAP off hook message, the trunk diverter circuit 116 sends the responder circuit 122 a disconnect message in step 334 and the CPU 130 keeps that particular responder circuit on the retest list because the PSAP facility 102 is unavailable.

The trunk diverter circuit 116 releases its PTN line in step 336 and the routine 200 returns via step 337 to the steps in FIG. 4 after: (1) the responder circuit 122 determines that the PSAP is off hook and the CPU 130 maintains that responder circuit on the retest list in step 334, (2) the responder circuit successfully connects and transmits the PSAP on hook message in step 330, (3) the trunk diverter circuit receives a busy signal from the responder in step 320, or (4) the network timer expires in step 322.

As noted above, the instant network backup system of the present invention preferably uses several responder circuits 122 placed at various locations within the 911 network 101 and the PTN 119. As shown in FIG. 1, responder circuits 122 and 122' are preferably installed proximate to PSAP facilities 102 and 102' because the likelihood of a cable or line disconnect between the responder circuit and the PSAP facility is negligent. At least one responder circuit 122 is preferably installed proximate to each PSAP facility 102 in a given geographic region. Most PSAP facilities 102 have many incoming 911 trunks 106. To provide the most secure network, one responder circuit 122 is preferably installed at the PSAP facility for each incoming 911 trunk 106, however, often only a few responder circuits are installed for a few of the trunks. To further improve the security of the 911 network 101, responder circuits 122 are preferably also installed in the tandem switch 110.

If a regional disaster occurs, such as an earthquake, numerous disruptions in the 911 network 101 occur. In this scenario, the trunk diverter circuits 116 distributed within this region will quickly establish alternate paths 118 to any available responder circuits 122. Generally, more trunk diverter circuits 116 will be installed within a given region than responder circuits 122 because fewer PSAP facilities 102 exist within a given region than C.O.s. If only a few responder circuits 122 and PSAP facilities 102 are accessible, then all of the trunk diverter circuits 116 within the region would tie up and maintain all of those responder circuits. Consequently, any trunk diverter circuit 116 which failed to establish an alternate path 118 to one of the available PSAP facilities 102 via the few responder circuits 122 would be locked out or prohibited from establishing such a path and any incoming 911 calls 114 could not be connected to a PSAP facility.

To compensate for this potential problem caused by a regional disaster, a first alternative embodiment of the present invention assigns each responder circuit 122 in a geographic region to one of two classes: an express class and a non-express class. This first alternative embodiment, and all alternative embodiments described herein, are substantially similar to the first described embodiment and only the differences in construction and/or operation are described in detail. A trunk diverter circuit 116 may maintain an alternative path 118 under the steps of FIG. 9 with a responder circuit 122 in the express or active class, but may not maintain such a path with a responder circuit 122 in the non-express class. A system manager or technician identifies and assigns each responder circuit 122 within a given region to one of the two classes in the TDC's responder database when a given trunk diverter circuit 116 is installed.

In the first alternative embodiment, when the trunk diverter circuit 116 detects a malfunction in the 911 network 101 under the steps of FIG. 5, the CPU 130 determines if a 911 call is in progress in step 222. If the CPU 130 determines that a 911 call is not in progress, then in step 236, the trunk diverter circuit 116 dials the PTN number of only those responder circuits 122 that are indicated in the TDC's responder database as being express. Thereafter, the trunk diverter circuit 116 and selected responder circuit 122 maintain the alternate path 118 under the link maintenance routine shown in FIG. 9.

If the trunk diverter circuit 116 detects that a 911 call is in progress in step 236, then in step 236 the trunk divert circuit dials the PTN number of either class of responder circuits 122, i.e., either the express or non-express class of responder circuits. As a result, in the event of a regional disaster, only a portion of the trunk diverter circuits 116 within the region (e.g., 50%) lock up and maintain communications paths with the available PSAP facilities 102. The remaining trunk diverter circuits 116 which fail to establish an alternate path 118 to a PSAP facility 102 can nevertheless still reroute a received 911 call 114 to an available PSAP facility 102. For example, a trunk diverter circuit 116 installed at a particular C.O. 112 may fail to establish an alternative path 118 with an available PSAP 102. The potential 911 callers 114 linked to the particular originating C.O. 112 can still contact the available PSAP facility 102 through either class of responder circuits 122 installed therein, even though many of the express class responder circuits are maintained by other trunk diverter circuits 116 in the region.

Figure 11:
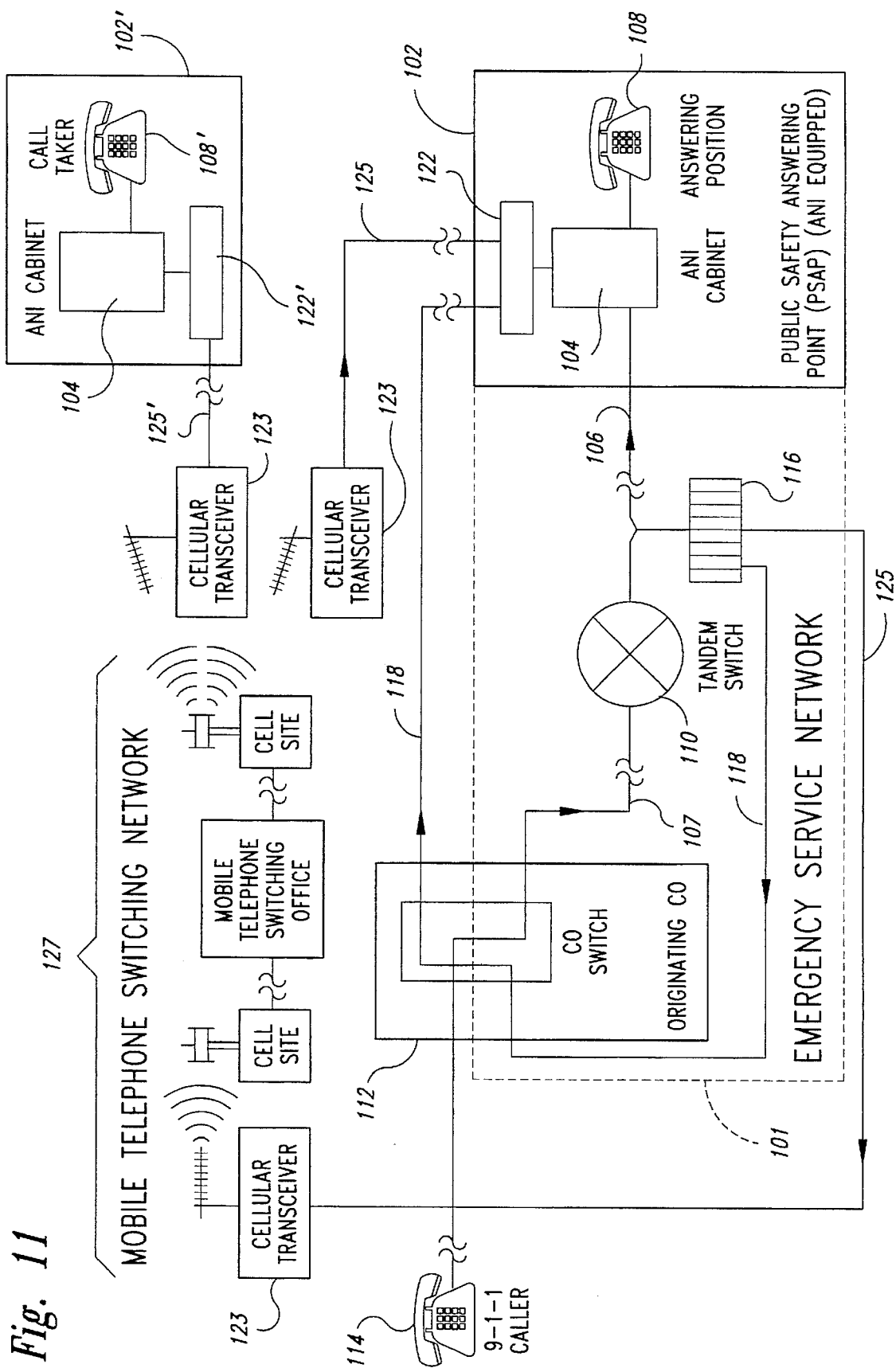
FIG. 11 is a block diagram of the communications network backup system of FIGS. 1B and 1C shown in an alternative configuration.

While the present invention has been generally described herein with a trunk diverter circuit 116 located proximate to the originating C.O. 112 and a responder circuit 122 located proximate to the PSAP facility 102, the trunk diverter and responder circuits may be located at various points within the 911 network 101 and the PTN 119. As shown in FIG. 11, a trunk diverter circuit 116 can also be installed proximate to the tandem switch 110. As a result, the trunk diverter circuit 116 may detect for a failure of the PSAP's 911 trunk 106. By installing trunk diverter switches 116 at both the originating C.O. 112 and the tandem switch 110, failures along both tandem trunk 107 and the 911 trunk 106 may be monitored and backed up.

Additionally, while the present invention has been generally described herein as establishing an alternative path 118 for a 911 call using the PTN 119 land lines, the present invention can also establish an alternative route using available cellular or mobile telephone switching networks 127. As shown in FIG. 11, the trunk diverter circuit 116 and the responder circuit 122 may each be coupled to a cellular transceiver 123 so that the trunk diverter circuit can reroute a 911 call through either the alternative land line network path 118 or an alternate cellular network path 125.

Figure 12:
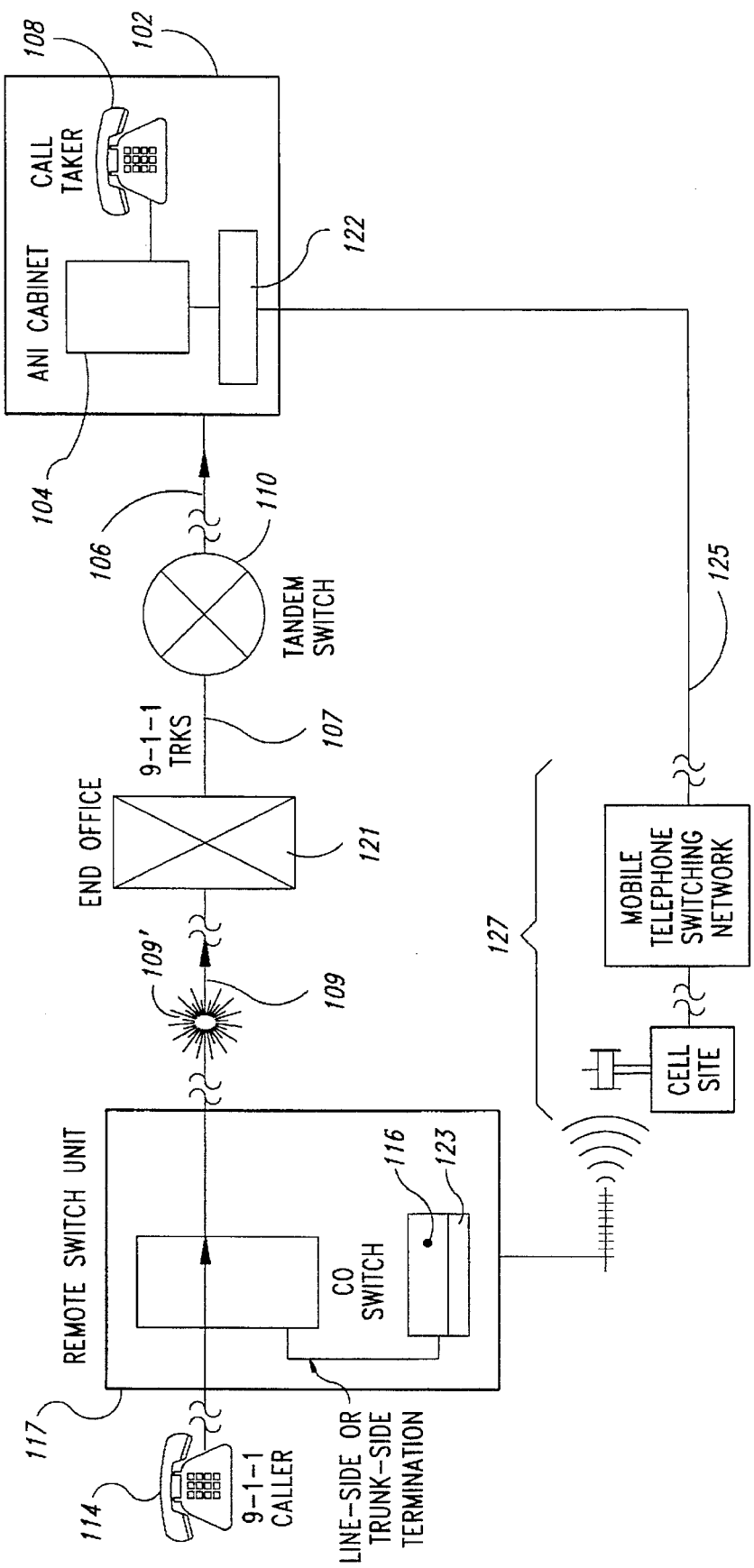
FIG. 12 is a block diagram of a second alternative embodiment of the communications network backup system of FIGS. 1B and 1C.

Referring to FIG. 12, some geographic regions use remote switch units 117. Remote switch units 117 are connected to an end office or host 121 via a proprietary data link that is commonly referred to as an "umbilical" 109. Together these remote switch units 117 and their hosts 121 are logically considered as a single C.O. If the umbilical 109 is disrupted (shown as a cable break 109' in FIG. 12), the remote switching unit 117 enters into an alarm state referred to as "emergency stand alone" and provides an alarm signal to associated circuitry at the remote switch unit. During the emergency stand alone state, the remote switch unit 117 directs all 911 calls to a ground start line circuit as if the 911 caller 114 had dialed a local PTN telephone number.

In a second alternative embodiment of the present invention; a trunk diverter circuit 116 is installed at the remote switch unit 117. The trunk diverter circuit 116 receives the alarm signal through the relay K7. The CPU 130 in step 205 detects this alarm signal and the trunk diverter circuit 116 performs the steps of the routine 200 described above, including the link maintenance routine shown in FIG. 9. As a result, the second alternative embodiment of the present invention monitors for disruptions in the umbilical 109 and establishes the alternate path with an available responder circuit 122 after detecting the disruption.

As shown in FIG. 12, the trunk diverter circuit 116 is connected to and housed together with the cellular transceiver 123, and thus the trunk diverter circuit establishes the alternate cellular network path 125 over the mobile telephone switching network 127. Thereafter, the trunk diverter circuit 116 reroutes any received 911 calls over this established alternate path 125 under the routine 200 described herein.

Few remote switch units have standard analog trunks that provide conventional ANI data. Therefore, the remote switch units 117 must transfer 911 calls 114 to ground start line circuits. Due to the ground start line protocols used by these remote switch units 117, conventional ANI data is unavailable. Therefore, the remote switch unit 117 cannot transmit a 911 caller's ANI data to the trunk diverter circuit 116 in the conventional MF format. As a result, when a 911 call 114 is diverted to a PSAP facility 102 from these remote switch units 117, the personnel at the PSAP facility do not receive any ANI data and therefore cannot tell from where the call came.

To compensate for the lack of conventional ANI data from remote switching units 117, in the second alternative embodiment, the RAM 131 stores pseudo ANI data. The pseudo ANI data is particular to each remote switch unit 117 within a region and identifies the geographic region within which the remote switch unit is located. The system manager installing the trunk diverter circuit 116 within the particular remote switch unit 117 selects or inputs the appropriate pseudo ANI data into the RAM 131 using, for example, the alarm and data port card. The pseudo ANI data also provides a message indicating that specific data is unavailable. In the second alterative embodiment, the trunk diverter circuit 116 does not perform the ANI routine shown in FIG. 6. Instead, the trunk diverter circuit 116, after detecting that a 911 call is in progress in steps 222 or 258, provides the pseudo ANI data to the PSAP facility in step 276 (FIG. 8). As a result, the pseudo ANI data provides answering personnel at the PSAP facility 102 with an indication as to which geographic region the 911 call originated.

In a third alternative embodiment of the present invention, the trunk diverter circuit 116 not only operates as described above in what may be referred to as a "trunk monitor mode," but also operates in a "non-monitor" mode upon appropriate setting of a software switch in the routine 200. In the non-monitor mode, the trunk diverter circuit 116 does not monitor the outgoing tandem trunk 107. Instead, the originating C.O. 112, after receiving a 911 call 114, attempts to route the call to the PSAP facility 102. After failing to successfully route the 911 call 114, the originating C.O. 112 switches the call to the trunk diverter circuit 116, which in turn establishes and reroutes the call to the PSAP facility 102 over the alternate path 118. The alternate path 118 is thereafter maintained.

In the non-monitor mode, the relay contacts K1A and K1B in FIG. 2A are continuously actuated so that all calls received over the tip and ring leads TO and RO of the tandem trunk 107 are diverted to the trunk diverter circuit 116. The trunk diverter circuit 116 emulates the protocols of the tandem switch 110, and thus, the trunk diverter circuit appears to the originating C.O. 112 as another tandem switch. When the 911 network 101 is suffering a malfunction, the originating C.O. 112 attempts to route the first received 911 call 114 to the PSAP facility 102 through all available tandem trunks 107 before the call is diverted to the trunk diverter circuit 116 over the leads TO and RO.

The CPU 130 does not perform the trunk monitoring steps of the trunk monitor routine shown in FIG. 5 (including steps 205, 212, 210 and 214). Instead, the CPU 130 detects for the 911 call 114 in step 208 by detecting current flow through the tip and ring leads TO and RO by means of the optical couplers OC3 and OC4. After detecting the 911 call 114 in step 208, the CPU 130 sets the 911 alarm timer in step 216.

The CPU 130 thereafter finds the alternate path 118 to an available responder circuit 122 and connects the 911 call 114 to the PSAP facility 102 therethrough as described above. After either the CPU 130 or the CPU 150 detect in step 278 (FIG. 8) that the 911 call 114 is no longer in progress, the trunk diverter circuit 116 and the responder circuit 122 continue to maintain the alternate path 118 under the steps of the link maintenance routine shown in FIG. 9. The trunk diverter and responder circuits 116 and 122 maintain the alternate path 118 for the duration of the 911 alarm timer set in step 216.

The first 911 caller 114 suffers the delays caused by (i) the originating C.O. 112 attempting to route the call through the malfunctioning 911 network 101, and (ii) the trunk diverter circuit 116 establishing and rerouting the call along the alternate path 118 to the responder circuit 122. Consequently, this first 911 caller experiences a substantial delay before their call is received by the PSAP facility 102.

However, since the trunk diverter circuit 116 and the responder circuit 122 maintain the alternate path 118 after this first call, any subsequent 911 callers 114 do not experience such a delay.

In a given PTN, several known trunk type signaling protocols may be used, including tip/ring loop (reverse battery) E&M types 1 or 2 (2-wire or 4-wire), or ground start ring down. Therefore, the trunk diverter circuit 116 preferably provides protocol conversion where necessary between differing protocols such as conversion between ring down ground start circuit protocols to loop reverse battery or E&M trunk signaling.

The trunk diverter circuit 116 and responder circuit 122 of the instant network backup system of the present invention locate and maintain communication paths between each other whenever a dedicated communication path such as the trunks 106 or 107 fail. The present invention establishes the alternative path 118 or 125 within the PTN 119 or the mobile telephone switching network 127, respectively. When the trunk diverter circuit 116 receives a 911 call, the trunk diverter circuit and responder circuit 122 surrender the established alternative path 118 or 125 to the 911 call. The 911 caller does not experience a delay beyond the normal delay in the emergency service network 101. The trunk diverter circuit 116 and responder circuit 122 maintain the alternative path 118 or 125 after the 911 call disconnects if the trunks 106 or 107 are still malfunctioning, until the malfunction is corrected.

While the present invention has generally been described herein as backing up a communication path within an emergency response telecommunications network, the present invention may also be used in a variety of communication environments. For example, the present invention may be used to back up communication paths between two facilities or locations which regularly exchange data over trunk lines or other dedicated communication paths. The present invention may be used to ensure that electronic funds transfer ("EFT") within the financial and banking environments are not disrupted. Furthermore, the present invention may be used to establish alternative communications paths within computer network environments. Consequently, as used herein, the terms telephone and telephone transceiver can include all types of transceivers including modems, cellular phones, fax machines, and so forth, and the "911 call" may include any predetermined request signal by such transceivers that instruct the present invention to surrender the alternative communications path thereto.

Although specific embodiments of the invention have been described for purposes of illustration, various modifications may be made without departing from the spirit and scope of the invention as will be recognized in the relevant art based on the detailed description provided herein. Accordingly, the invention is limited by the disclosure, but instead its scope is to be determined entirely by reference to the following claims.

I claim:

1. In a telecommunications network, a method for maintaining a telecommunications path between a telecommunications switching location and an emergency response service facility, the telecommunications switching location being coupled to a plurality of telephone transceivers and being capable of coupling each of the plurality of telephone transceivers to the emergency response service facility upon receiving a predetermined request signal from one of the plurality of telephone transceivers, the method comprising the steps of:

monitoring at the telecommunications switching location a public switched telephone network trunk providing a first telecommunications path between the telecommunications switching location and the emergency response service facility;

determining if the first telecommunications path is disrupted;

in response to determining that the first telecommunications path is disrupted, establishing a second telecommunications path between the telecommunications switching location and the emergency response service facility before receiving the predetermined request signal by one of the plurality of telephone transceivers, the predetermined request signal being a personal emergency voice telephone call;

continuously maintaining the second telecommunications path; and in response to the predetermined request signal by one of the plurality of telephone transceivers, coupling the one telephone transceiver through the second telecommunications path to the emergency response service facility after the steps of establishing and maintaining the second telecommunications path.

2. The method of claim 1 wherein the second telecommunications path is through a cellular telephone network.

3. The method of claim 1 wherein the step of maintaining the second telecommunications path prohibits the plurality of telephone transceivers from being coupled to the second telecommunications path until the telecommunications switching location receives the predetermined request signal.

4. The method of claim 1 wherein the step of monitoring includes the step of determining whether a signal from the trunk is acceptable.

5. The method of claim 1, further comprising the step of providing an indication to the one telephone transceiver if the second telecommunications path is unavailable.

6. The method of claim 5 wherein the indication is an audible indication.

7. The method of claim 1, further comprising the step of providing a data signal to the emergency response service facility over the second telecommunications path after receiving the predetermined request signal, the data signal being associated with the one telephone transceiver that provided the predetermined request signal.

8. The method of claim 1, further comprising the steps of monitoring the first telecommunications path to determine if it is no longer disrupted, and uncoupling the second telecommunications path when the first telecommunications path is no longer disrupted.

9. The method of claim 1, further comprising the steps of maintaining the second telecommunications path for a selected time period, and uncoupling the second communications path when the selected time period expires.

10. The method of claim 1 wherein the step of maintaining the second telecommunications path includes the step of exchanging signals between the telecommunications switching location and the emergency response service facility.

11. The method of claim 1, further comprising the steps of determining if the emergency response service facility becomes unavailable, establishing a third telecommunications path between the telecommunications switching location and another emergency response service facility before receiving the predetermined request signal by one of the plurality of telephone transceivers, maintaining the third telecommunications path, and providing the third telecommunications path to one of the plurality of telephone transceivers upon receipt of the predetermined request signal by the telephone transceiver.

12. A system for maintaining communications between an emergency response service facility and a telecommunications switching location over a public switched telephone network trunk or an alternative telecommunications path, the telecommunications switching location being coupled to a plurality of telephone transceivers and being capable of coupling one of the plurality of telephone transceivers to the emergency response service facility upon receiving a predetermined request signal from one of the plurality of telephone transceivers, the system comprising:

a first transceiver positioned at the emergency response service facility, the first transceiver being coupled to the alternative telecommunications path; and a second transceiver coupled to the public switched telephone network trunk and to the alterative telecommunications path and positioned at the telecommunications switching location, the second transceiver having a memory, a processing unit coupled to the memory and at least one coupling circuit intercoupling the processing unit to the public switched telephone network trunk and to the alternative telecommunications path, the processing unit monitoring the public switched telephone network trunk, and the processing unit approximately continuously exchanging signals with the first transceiver over the alternative telecommunications path after the processing unit determines that the public switched telephone network trunk is faulty, but before the processing unit receives the predetermined request signal so that the alternative communications path is available for the one telephone transceiver, and the processing unit providing the alternative telecommunications path to the one telephone transceiver after the processing unit receives the predetermined request signal, and after the processing unit approximately continuously exchanges signals with the first transceiver, the predetermined request signal being a personal emergency voice telephone call.

13. The system of claim 12 wherein the processing unit, after receiving the predetermined request signal, provides a data request signal to the telecommunications switching location requesting that the telecommunications switching location provide to the processing unit a data signal identifying the one telephone transceiver.

14. The system of claim 13 wherein the second transceiver further comprises a generator capable of producing a plurality of frequency signals, the generator coupled to the processing unit and the telecommunications switching location, the generator providing the data signal to the emergency response service facility.

15. The system of claim 14, further comprising a voice message generator coupled to the processing unit that provides voice messages to the one telephone transceiver.

16. The system of claim 12, further comprising a third transceiver at another emergency response service facility, the third transceiver being coupled to another alternative telecommunications path, and wherein the second transceiver couples to the third transceiver via the another alternative telecommunications path if the processing unit determines that the first transceiver is unavailable.

17. The system of claim 16 wherein the memory includes first and third telephone numbers of the first and third transceivers, respectively, and wherein the second transceiver establishes one of the alternative and another alternative communication paths by dialing one of the first and third telephone numbers, respectively.

18. The system of claim 12 wherein the processing unit discontinues exchanging signals with the first transceiver over the alternative telecommunications path when the public switched telephone network trunk is no longer faulty.

19. The system of claim 12 wherein the processing unit exchanges signals with the first transceiver over the alternative telecommunications path for a selected time period.

20. A method of maintaining a signal exchange between a telecommunications switching location and an emergency response service facility having first and second transceivers associated therewith, the first and second transceivers being selectively coupled for signal exchange about a signal path upon receiving an initiation, the method comprising the steps of:,
   monitoring at the emergency response service facility a public switched telephone network trunk coupling the telecommunications switching location to the emergency response service facility, the first and second transceivers being located at the telecommunications switching location and the emergency response service facility respectively;
   determining if the public switched telephone network trunk is disrupted;
   after the step of determining that the public switched telephone network trunk is disrupted, establishing a second signal path between the emergency response service facility and the telecommunications switching location before receiving the initiation by a third transceiver, the initiation being a personal emergency voice telephone call;
   continuously maintaining the second signal path; and
   after the steps of establishing and maintaining the second signal path, providing the second signal path from the third transceiver to the second transceiver upon receipt of the initiation from the third transceiver.

21. A system for maintaining communications between an emergency response service facility and a telecommunications switching location over a public switched telephone network trunk or an alternative telecommunications path, the telecommunications switching location being coupled to a plurality of telephone transceivers and being capable of coupling one of the plurality of telephone transceivers to the emergency response service facility upon receiving a predetermined request signal from one of the plurality of telephone transceivers, the system comprising:
   a first transceiver coupled to the alternative telecommunications path and being positioned at the emergency response service facility; and
   a second transceiver coupled to the public switched telephone network trunk and the alternative telecommunications path, and being located at the telecommunications switching location, the second transceiver having a memory and a database in the memory that indicates that the first transceiver is active, a processing unit coupled to the memory and at least one coupling circuit intercoupling the processing unit to the public switched telephone network trunk and the alternative telecommunications path, the processing unit monitoring the public switched telephone network trunk, and the processing unit approximately continuously exchanging signals with the first active transceiver over the alternative telecommunications path after the processing unit determines that the public switched telephone network trunk is faulty, but before the processing unit receives the predetermined request signal so that the alternative communications path is available for the one telephone transceiver, and the processing unit providing the alternative telecommunications path to the one telephone transceiver after the processing unit receives the predetermined request signal, and after the processing unit approximately continuously exchanges signals with the first transceiver, the predetermined request signal being a personal emergency voice telephone call.

22. The system of claim 21 wherein the memory includes data identifying the telecommunications switching location, and wherein the processing unit, after receiving the predetermined request signal, provides the data to the emergency response service facility.

23. The system of claim 22 wherein the second transceiver further comprises a generator capable of producing a plurality of frequency signals, the generator coupled to the processing unit and the telecommunications switching location, the generator providing the data to the emergency response service facility.

24. The system of claim 21, further comprising a third transceiver coupled to a third telecommunications path at either the emergency response service facility or another emergency response service facility, and wherein the second transceiver couples to the third transceiver via the third telecommunications path after receiving the predetermined request signal if the processing unit determines that the first active transceiver is unavailable.

25. The system of claim 24 wherein the database in the memory includes first and third telephone numbers of the first and third transceivers, respectively, and wherein the second transceiver establishes one of the alternative and third communication paths by dialing one of the first and third telephone numbers, respectively.

26. The system of claim 21 wherein the processing unit discontinues exchanging signals with the first active transceiver over the alternative telecommunications path when the public switched network trunk is no longer faulty.

27. The system of claim 26 wherein the processing unit exchanges signals with the first active transceiver over the alternative telecommunications path for a selected time period.

28. A method of maintaining a signal exchange between an emergency response service facility and a telephone switching location having respective first and second transceivers associated therewith, the first and second transceivers being selectively coupled for signal exchange about a signal path upon receiving an initiation, the method comprising the steps of:
   designating the first transceiver as active;
   monitoring at the telephone switching location a public switched telephone network trunk coupling the emergency response service facility to the switching location, the telephone switching location being coupled to a plurality of telephone receivers;
   determining if the public switched telephone network trunk is disrupted;
   in response to determining that the public switched telephone network trunk is disrupted, establishing an alternative signal path between the emergency response service facility and the telephone switching location before receiving the initiation by a third transceiver, the initiation being a personal emergency voice telephone call;
   continuously maintaining the alternative signal path; and
   in response to initiation by the third transceiver, coupling the third transceiver through the alternative signal path to the emergency response service facility after the steps of establishing and maintaining the alternative signal path.

29. The method of claim 28, further comprising the steps of:

detecting the initiation by the third transceiver;

establishing the alternative or a third signal path to the first or a fourth transceiver, respectively, the fourth transceiver being located at another emergency response service facility; and providing the alternative or third signal path to the third transceiver.

30. A system for maintaining communications between an emergency response service facility and a telecommunications switching location over a public switched telephone network trunk or an alternative telecommunications path, the telecommunications switching location being coupled to a plurality of telephone transceivers and being capable of coupling one of the telephone transceivers to the emergency response service facility upon receiving a predetermined request signal from one of the plurality of telephone transceivers, the telecommunications switching location also providing an alarm signal after detecting a faulty condition on the public switched telephone network trunk, the system comprising:

a first transceiver positioned at the emergency response service facility, and the first transceiver being coupled to the alternative telecommunications path; and a second transceiver coupled to the public switched telephone network trunk and the alternative telecommunications path and being positioned at the telecommunications switching location, the second transceiver having a memory, a processing unit coupled to the telecommunications switching location and to the public switched telephone network trunk and the alternative telecommunications path, the processing unit approximately continuously exchanging signals with the first transceiver over the alternative telecommunications path after the processing unit senses the alarm signal, but before the processing unit receives the predetermined request signal so that the alternative telecommunications path is available for the one telephone transceiver, and the processing unit providing the alternative telecommunications path to the one telephone transceiver after the processing unit receives the predetermined request signal, and after the processing unit approximately continuously exchanges signals with the first transceiver, the predetermined request signal being a personal emergency voice telephone call.

31. The system of claim 30 wherein the memory includes data identifying the telecommunications switching location, and wherein the processing unit, after receiving the predetermined request signal, provides the data to the emergency response service facility.

32. In a telecommunications network, a method for maintaining a telecommunications path between an emergency response service facility and a telecommunications switching location that is coupled to a plurality of telephone transceivers and capable of coupling first and second telephone transceivers to the emergency response service facility over a public switched telephone network trunk upon receiving a predetermined request signal from one of the first and second telephone transceivers the telecommunications switching location also capable of determining if the public switched telephone network trunk is disrupted, the method comprising the steps of:

receiving the predetermined request signal from the telecommunications switching location, the predetermined request signal being a personal emergency voice telephone call;

in response to receiving the predetermined request signal, establishing another public switch telephone network trunk between the telecommunications switching location and the emergency response service facility;

after the step of establishing the another public switched telephone network trunk, providing the another public switched telephone network trunk to the first telephone transceiver for communication signal exchange between the first telephone transceiver and the emergency response service facility;

after the step of providing the another public switched telephone network trunk, continuously maintaining the another public switched telephone network trunk following a termination of communication signal exchange between the first telephone transceiver and the emergency response service facility; and after the step of maintaining the another public switched telephone network trunk, providing the another public switched telephone network trunk to the second telephone transceiver upon receipt of the predetermined request signal by the second telephone transceiver.

* * * * *

UNITED STATES PATENT AND TRADEMARK OFFICE
CERTIFICATE OF CORRECTION

PATENT NO. : 5,661,779
DATED : August 26, 1997
INVENTOR(S) : Otha C. Lee

It is certified that error appears in the above-indentified patent and that said Letters Patent is hereby corrected as shown below:

In column 24, claim 32, line 25, after "public" delete "switch" and substitute therefor -- switched --.

Signed and Sealed this

Twenty-eighth Day of July, 1998

Attest:

BRUCE LEHMAN

Attesting Officer     Commissioner of Patents and Trademarks